(12) United States Patent
Chen et al.

(10) Patent No.: US 12,314,964 B2
(45) Date of Patent: May 27, 2025

(54) CONTEXTUAL APPLICATION TRACKING

(71) Applicant: YAHOO ASSETS LLC, Dulles, VA (US)

(72) Inventors: Luojian Chen, San Jose, CA (US); Reiner Kraft, Gilroy, CA (US); Guan Guan, Sunnyvale, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 1075 days.

(21) Appl. No.: 16/183,805

(22) Filed: Nov. 8, 2018

(65) Prior Publication Data

US 2019/0073681 A1 Mar. 7, 2019

Related U.S. Application Data

(63) Continuation of application No. 13/461,271, filed on May 1, 2012, now Pat. No. 10,157,389.

(51) Int. Cl.
| | |
|---|---|
| *G06F 16/20* | (2019.01) |
| *G06F 16/2457* | (2019.01) |
| *G06F 16/9535* | (2019.01) |
| *G06F 16/958* | (2019.01) |
| *G06Q 30/02* | (2023.01) |
| *H04L 67/50* | (2022.01) |
| *G06Q 30/0201* | (2023.01) |

(52) U.S. Cl.
CPC ............. *G06Q 30/02* (2013.01); *G06F 16/20* (2019.01); *G06F 16/2457* (2019.01); *G06F 16/9535* (2019.01); *G06F 16/958* (2019.01); *H04L 67/535* (2022.05); *G06Q 30/0201* (2013.01)

(58) Field of Classification Search
CPC .... G06Q 30/02; G06Q 30/0201; G06F 16/20; G06F 16/2457; G06F 16/9535; G06F 16/958; H04L 67/22; H04L 67/535
See application file for complete search history.

(56) References Cited

U.S. PATENT DOCUMENTS

| | | |
|---|---|---|
| 6,654,725 B1 | 11/2003 | Langheinrich et al. |
| 7,346,606 B2 | 3/2008 | Bharat |
| 7,788,245 B1 | 8/2010 | Eddings et al. |
| 7,873,621 B1 | 1/2011 | Datar |
| 8,317,624 B1 | 11/2012 | Lam |
| 8,543,925 B2 | 9/2013 | Weitz et al. |

(Continued)

FOREIGN PATENT DOCUMENTS

WO    WO2001084430 A2 * 11/2001  ............ G06Q 30/02

OTHER PUBLICATIONS

Office Action mailed Jan. 11, 2019 in U.S. Appl. No. 13/461,108.

(Continued)

*Primary Examiner* — Etienne P Leroux
*Assistant Examiner* — Oscar Wehovz
(74) *Attorney, Agent, or Firm* — Venable LLP

(57) ABSTRACT

System and method for trackable applications including an application providing unit, a controller, and an incentive tracker. The application providing unit is adapted to send a trackable application upon request. The controller is adapted to receive interactions from the trackable application. The incentive tracker is adapted to select an incentive based on the interaction data. The controller is further adapted to send the selected incentive to the trackable application.

20 Claims, 17 Drawing Sheets

(56) References Cited

U.S. PATENT DOCUMENTS

| | | | |
|---|---|---|---|
| 8,555,313 | B2 | 10/2013 | Newnam et al. |
| 8,613,024 | B2 | 12/2013 | Bovenschulte et al. |
| 9,282,126 | B1* | 3/2016 | Mateer .................. H04L 63/083 |
| 10,204,169 | B2 | 2/2019 | Chen et al. |
| 2003/0182394 | A1* | 9/2003 | Ryngler ................ H04W 4/029 709/217 |
| 2004/0059708 | A1 | 3/2004 | Dean et al. |
| 2006/0224752 | A1 | 10/2006 | Parekh |
| 2006/0270421 | A1 | 11/2006 | Phillips et al. |
| 2008/0027707 | A1 | 1/2008 | Stefik et al. |
| 2008/0098420 | A1 | 4/2008 | Khiversara |
| 2008/0114774 | A1 | 5/2008 | Subramanian et al. |
| 2008/0168099 | A1* | 7/2008 | Skaf .................... G06F 16/9535 |
| 2008/0194233 | A1 | 8/2008 | Henry |
| 2008/0229352 | A1 | 9/2008 | Pino et al. |
| 2008/0244399 | A1* | 10/2008 | Hilgers ................... G06F 9/453 715/708 |
| 2008/0262901 | A1 | 10/2008 | Banga et al. |
| 2009/0006624 | A1 | 1/2009 | Alkove |
| 2009/0037822 | A1 | 2/2009 | Kandekar et al. |
| 2009/0113346 | A1* | 4/2009 | Wickramasuriya ... G06F 3/0481 715/810 |
| 2009/0171968 | A1* | 7/2009 | Kane .................. G06F 16/9535 |
| 2009/0254824 | A1 | 10/2009 | Singh |
| 2009/0327401 | A1 | 12/2009 | Gage |
| 2010/0057577 | A1 | 3/2010 | Stefik et al. |
| 2010/0250324 | A1 | 9/2010 | Kanodia |
| 2010/0262658 | A1 | 10/2010 | Mesnage |
| 2011/0059800 | A1 | 3/2011 | Anderson et al. |
| 2011/0070942 | A1 | 3/2011 | Mehta et al. |
| 2011/0082915 | A1 | 4/2011 | Carr |
| 2011/0153424 | A1* | 6/2011 | Huang ............... G06Q 30/0255 705/14.49 |
| 2011/0197224 | A1 | 8/2011 | Meijer |
| 2011/0258026 | A1 | 10/2011 | Prince |
| 2012/0015716 | A1 | 1/2012 | Mosites |
| 2012/0066267 | A1 | 3/2012 | Beatty et al. |
| 2012/0131184 | A1* | 5/2012 | Luna .................... H04W 28/14 709/224 |
| 2012/0143694 | A1 | 6/2012 | Zargahi et al. |
| 2012/0150888 | A1 | 6/2012 | Hyatt |
| 2012/0185310 | A1* | 7/2012 | Greenspun .......... G07F 17/3255 705/14.12 |
| 2012/0214568 | A1 | 8/2012 | Herrmann |
| 2012/0290938 | A1 | 11/2012 | Subbarao et al. |
| 2012/0310717 | A1* | 12/2012 | Kankainen ............. G06Q 30/02 705/14.4 |
| 2013/0030925 | A1 | 1/2013 | Calman et al. |
| 2013/0086159 | A1 | 4/2013 | Gharachorloo |
| 2013/0144958 | A1 | 6/2013 | St. Jacques, Jr. |
| 2013/0212082 | A1* | 8/2013 | Li ........................ G06F 11/302 707/706 |
| 2013/0297721 | A1 | 11/2013 | Chen |

OTHER PUBLICATIONS

Office Action issued on Feb. 27, 2015 in U.S. Appl. No. 13/461,108.
Office Action issued on Oct. 22, 2014 in Taiwanese Application No. 102113411.
International Preliminary Report on Patentability issued on Nov. 4, 2014 in International Application No. PCT/US2013/035363.
International Search Report on Patentability Dated Jul. 26, 2013 in International Application No. PCT/US2013/035363.
Office Action issued on Mar. 11, 2015 in U.S. Appl. No. 13/461,271.
Office Action issued on Jun. 24, 2014 in U.S. Appl. No. 13/461,271.
Office Action issued on Jul. 24, 2014 in U.S. Appl. No. 13/461,010.
Office Action issued on Feb. 6, 2015 in U.S. Appl. No. 13/461,010.
Supplementary European Search Report dated Apr. 16, 2015 in EP Application No. 13784750.5 .
"Malicous Codes and Viruses", CSE331: Introduction to Networks and Security, 2004, XP002737817, Penn Engineering.
Office Action issued on Aug. 24, 2015 in U.S. Appl. No. 13/461,271.
Office Action issued Sep. 11, 2015 in U.S. Appl. No. 13/461,108.
Office Action issued on Sep. 17, 2015 in U.S. Appl. No. 13/461,010.
Office Action issued Jan. 20, 2016 in U.S. Appl. No. 13/461,108.
Office Action issued Feb. 4, 2016 in U.S. Appl. No. 13/461,010.
Office Action issued Feb. 11, 2016 in U.S. Appl. No. 13/461,271.
Office Action issued May 19, 2016 in Chinese Application 201380021793.9.
Office Action issued Jun. 16, 2016 in U.S. Appl. No. 13/461,108.
Office Action issued Aug. 19, 2016 in U.S. Appl. No. 13/461,010.
Office Action issued Nov. 17, 2016 in U.S. Appl. No. 13/461,108.
Office Action issued Jan. 25, 2017 in U.S. Appl. No. 13/461,271.
Office Action issued Jan. 30, 2017 in U.S. Appl. No. 13/461,010.
Office Action issued Feb. 3, 2017 in Chinese Application 201380021793.9.
Office Action issued Jun. 2, 2017 in U.S. Appl. No. 13/461,108.
Office Action issued Jul. 5, 2017 in U.S. Appl. No. 13/461,010.
Office Action issued Aug. 25, 2017 in U.S. Appl. No. 13/461,271.
Office Action issued Nov. 2, 2017 in U.S. Appl. No. 13/461,010.
Office Action issued Feb. 7, 2018 in U.S. Appl. No. 13/461,108.
Office Action issued Mar. 13, 2018 in U.S. Appl. No. 13/461,271.
Office Action issued Apr. 25, 2018 in U.S. Appl. No. 13/461,010.
Office Action issued Jun. 15, 2018 in U.S. Appl. No. 13/461,108.
Notice of Allowance issued Aug. 8, 2018 in U.S. Appl. No. 13/461,271.
Henricksen et al., "Personalising Context Aware Applications," Co-operative Research Center for Enterprise Distributed Systems Technology, Australian Feder Govt CRC Programme, Aug. 19, 2005.
Notice of Allowance issued Sep. 24, 2018 in U.S. Appl. No. 13/461,010.
Notice of Allowance issued on Oct. 16, 2019 in U.S. Appl. No. 13/461,108.
Extended European Search Report received Apr. 15, 2021 in EP Application No. 20192361.2.
Notice of Allowance issued on Feb. 7, 2020 in U.S. Appl. No. 13/461,108.
Office Action received Jul. 10, 2020 in EP Application No. 13784750.5.
Final Office Action mailed Jul. 1, 2019 in U.S. Appl. No. 13/461,108.

* cited by examiner

CONTEXTUAL APPLICATION TRACKING

CROSS-REFERENCE TO RELATED APPLICATIONS

This application is a continuation of U.S. application Ser. No. 13/461,271 filed May 1, 2012 and relates to U.S. patent application Ser. No. 13/461,108, entitled "Contextual Application Customization," filed on May 1, 2012 and U.S. patent application Ser. No. 13/461,010, entitled "Contextual Application Delivery," filed on May 1, 2012, which are hereby incorporated by reference in their entirety.

BACKGROUND

1. Technical Field

The present teaching relates to methods, systems, and programming for providing content to users.

Particularly, the present teaching is directed to methods, systems, and programming for providing context aware content to users.

2. Discussion of Technical Background

Service providers such as social networking sites and news sites on the Internet attract hundreds of millions of users every month. The popularity of such a service provider depends on many factors. A factor is the content provided by service provider, which generates interest, functionality, and entertainment for the user.

To keep users interest in the content, the content should be useful, informative or entertaining but also new relevant. The better the content provided to users, the more users will visit the site and the longer the users will stay at the site. Thus, the site will become popular, generating more revenue. Poor content or content that is not new and changing may cause the users to become bored with the content and visit a different service provider. The popularity of a service provider on the Internet often leads to an increase in the number of users, which usually translates into a higher revenue. The more users a service provider attracts, the more potential the service provider has to provide improved revenues to its operator.

SUMMARY

The teachings disclosed herein relate to methods, systems, and programming for providing content to users. More particularly, the present teaching relates to methods, systems, and programming for providing context aware content to users.

In one example, a system for trackable applications comprising an application providing unit, a controller, and an incentive tracker is disclosed. The application providing unit is adapted to send a trackable application upon request. The controller is adapted to receive interactions from the trackable application. The incentive tracker is adapted to select an incentive based on the interaction data. The controller is further adapted to send the selected incentive to the trackable application.

In another example, a method implemented on a machine having at least one processor, storage, and a communication platform connected to a network of tracking context aware applications is disclosed. A request for a trackable application is received, by an application delivery system. The trackable application is sent, by the application delivery system. Interactions from the trackable application are received, by the application delivery system. An incentive is selected, by the application delivery system, based on the interaction data. The incentive is sent, by the application delivery system, to the trackable application.

Other concepts relate to software for implementing the generation of explanations for relationships. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

In yet another example, a machine-readable and non-transitory medium having information recorded thereon, wherein the information, when read by a machine, causes the machine to perform a method of tracking context aware applications is disclosed. A request for a trackable application is received. The trackable application is sent. Interactions from the trackable application are received. An incentive is selected based on the interaction data. The incentive is sent to the trackable application.

Additional advantages and novel features will be set forth in part in the description that follows, and in part will become apparent to those skilled in the art upon examination of the following and the accompanying drawings or may be learned by production or operation of the examples. The advantages of the present teaching may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The embodiments according to this disclosure, allow applications that are contextually relevant to content that a user is downloading or viewing on, for example, the Internet. The embodiments according to this disclosure, allow application that are adaptive to the content in which the applications are embedded. The embodiments according to this disclosure facilitate an online community for people that have the same interests to become connected.

Figure 1:
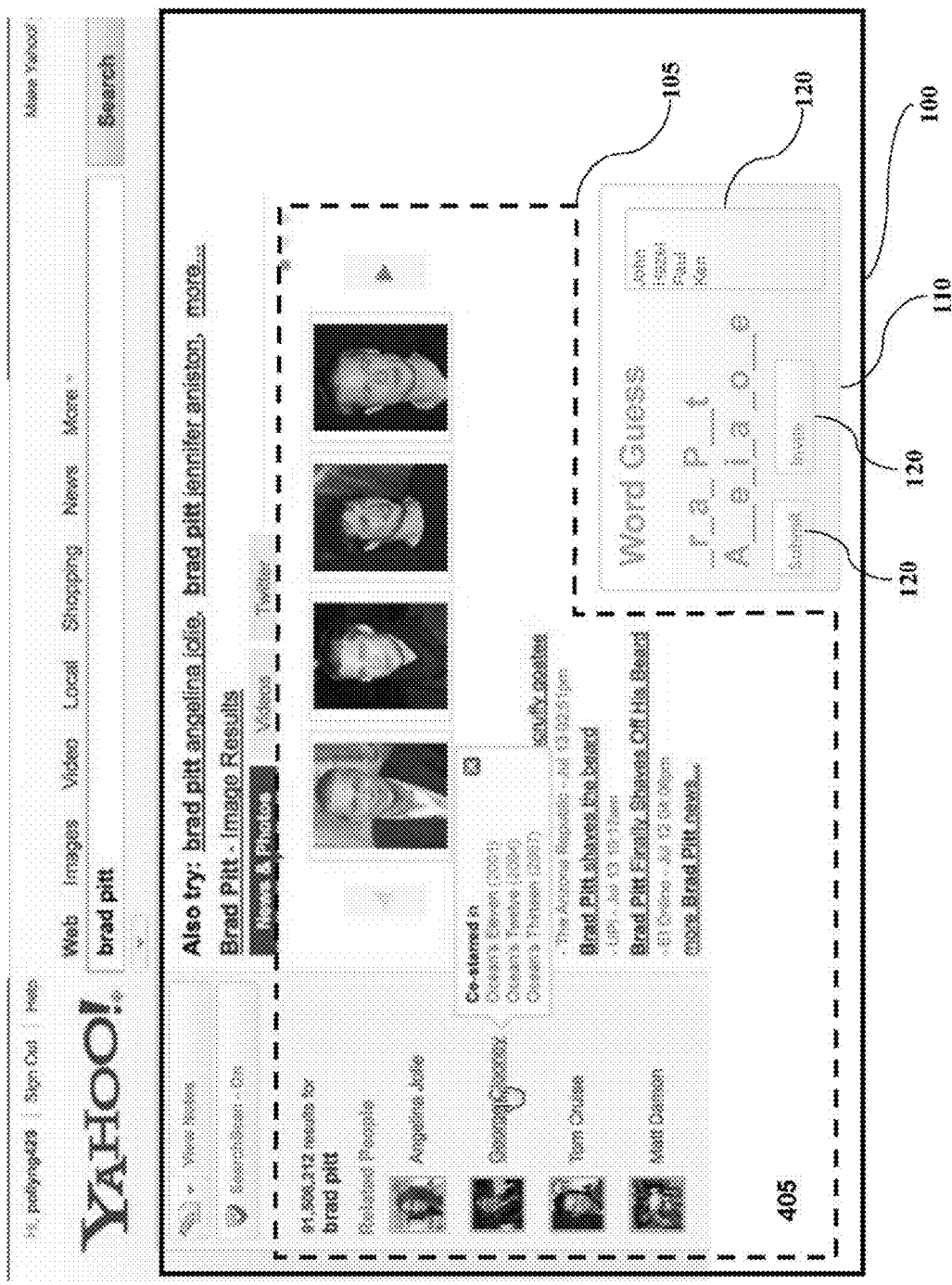
FIG. 1 illustrates a web page that is formed on the display of a device of a user, and displays content to the user according to an embodiment.

FIG. 1 illustrates a web page 100 that is formed on the display of a device of a user, and displays content to the user according to an embodiment. The web page 100 comprises a requested content 105 and a word game context aware application 110.

The web page 100 may contain any content downloaded by the user, during, for example, web browsing, e-mailing, instant messaging, etc. The word game context aware application 110 is placed within the webpage so as not to unduly disturb the layout of the content that the user requested. The requested content 105 is content requested by the user, by for example, clicking on an Internet link, performing an Internet search, writing or responding to e-mail or instant messaging, shopping, or any other activity compatible with embodiments of the disclosure.

The word game context aware application 110 is a widget written in, for example, JavaScript, HTML5, or CSS3 that is embedded on the web page 100. The word game context aware application 110 comprises word controls 115, a leader board 120, and invitation controls 125. The word game context aware application 110 has called a content analyzer (see, e.g., FIG. 5) to perform content analysis of the requested content 105. The content analyzer has returned words most relevant to the content requested. The word game presents words to the user with some characters hidden. The user has to guess the hidden words and enters the guests using the word controls 115. Points are computed and accredited to the account of the user based on the accuracy of the guesses. The leader board 120 indicates the current score of the best uses. Users can earn incentives when points reach certain levels. Users can invite friends via social network channels to use the word game context aware application 110 using the invitation controls 125.

Figure 2:
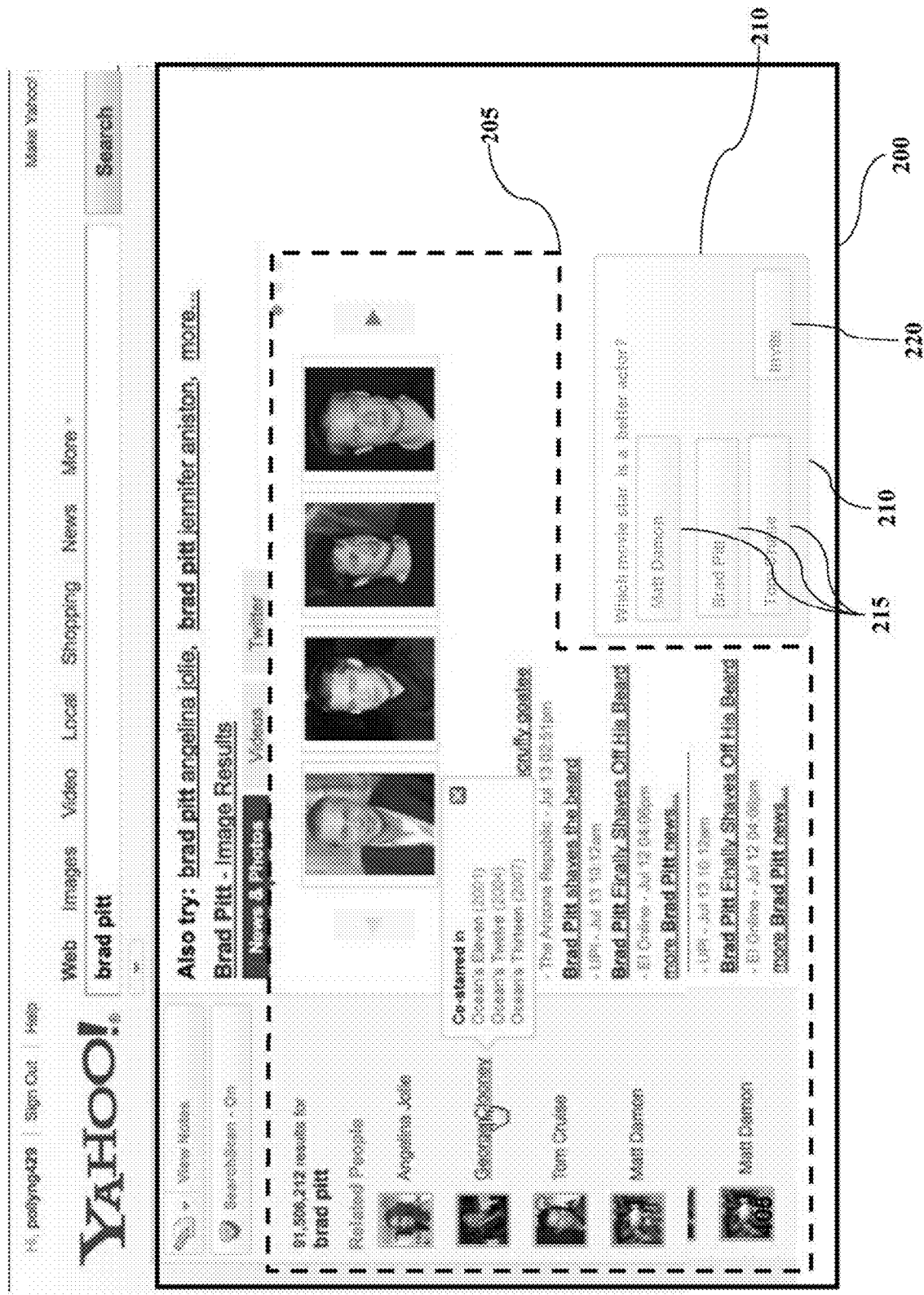
FIG. 2 illustrates a web page that is formed on the display of a device of a user, and displays content to the user according to an embodiment.

FIG. 2 illustrates a web page 200 that is formed on the display of a device of a user, and displays content to the user according to an embodiment. The web page 200 comprises a requested content 105 and a poll/vote context aware application 205.

The content of the webpage may be any content downloaded by the user, during, for example, web browsing, e-mailing, instant messaging, etc. The poll/vote context aware application 205 is placed within the webpage so as not to unduly disturb the layout of the content that the user requested. The poll/vote context aware application 205 is, for example, an algorithmically generated web browser based voting game/poll app. The poll/vote game can appear on any web page that has sufficient text content. The topic and choices of the poll is contextually related to the page that the poll appears on. The poll/vote context aware application 205 is, for example, a widget written in JavaScript, HTML5 and CSS3 that is embedded on a web page featuring, for example, celebrities. The poll/vote context aware application 205 comprises voting controls 210 and invitation controls 125. The poll/vote context aware application 205 calls the content analyzer (FIG. 5) to perform content analysis of the page. The content analyzer returns celebrities mentioned on the page and other related celebrities. The poll/vote context aware application 205 presents a poll to the user which lists the celebrities and asks the user to vote for a favorite celebrity. The user votes using the voting controls 210. Points are computed and accredited to an account of the user based on the voting. Results of the voting are tallied and displayed by the poll/vote context aware application 205. Users can earn incentives when the points reach certain levels. Users can invite friends via social network channels to use the poll/vote context aware application 205 using the invitation controls 125.

Figure 3:
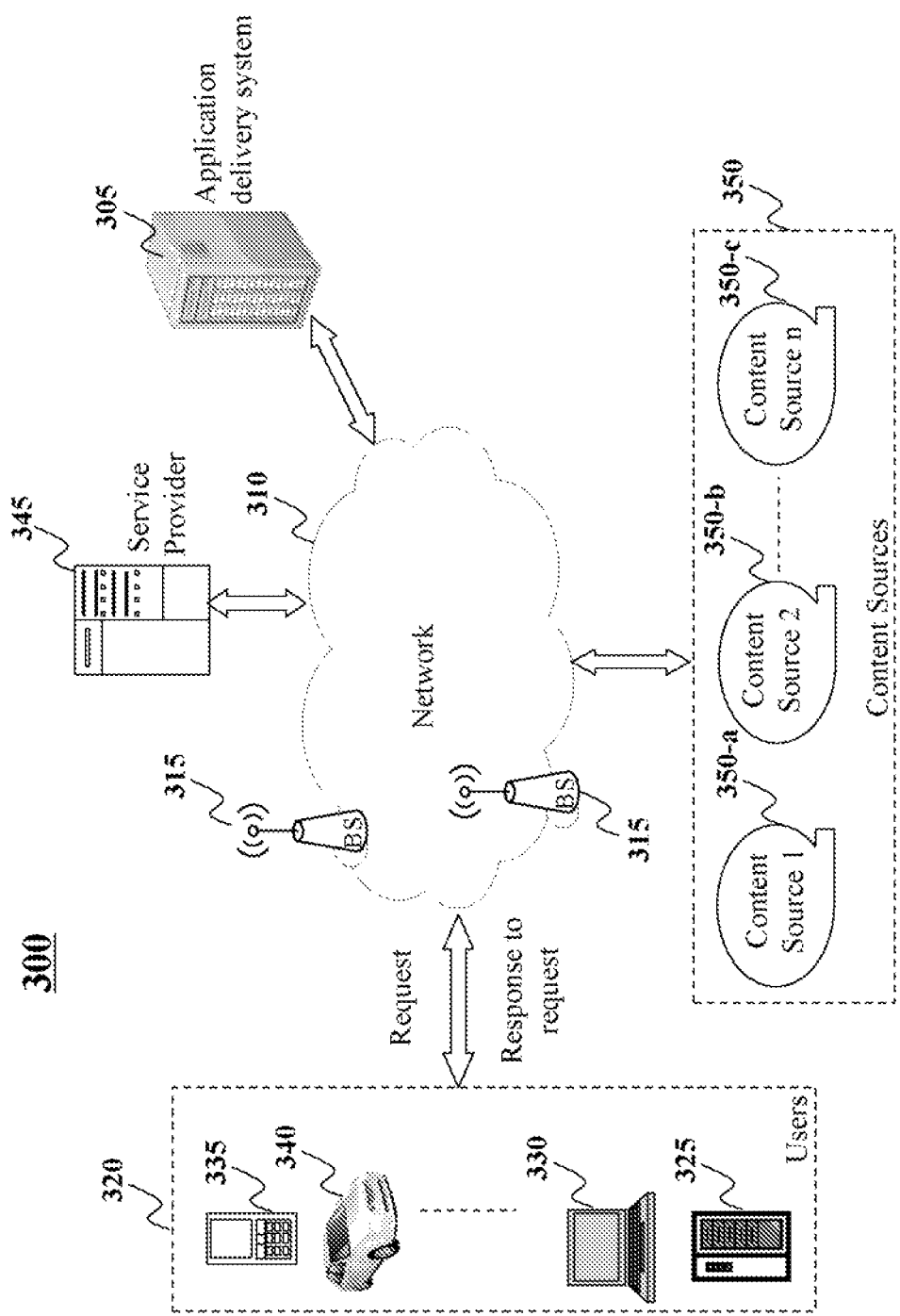
FIG. 3 illustrates a system including an application delivery system according to an embodiment.

FIG. 3 illustrates a system 300 including an application delivery system 305 according to an embodiment. The system 300 comprises an application delivery system 305, a network 310, users 320, a service provider 345, and content sources 350.

The system 300 allows users to send requests for content, for example, web pages to the service provider 345 via the network 310. The requests are received by the service provider 345. The service provider 345 responds to the requests by providing the requested content to the respective users via the network 310. The service provider 345 incorporates content obtained from the content sources 350 and the application delivery system 305.

The application delivery system 305 delivers context aware applications to the service provider 345 based on requests from the service provider 345. In some embodiments, the service provider 345 forwards the content requested by the user to the application delivery system 305 so that the application delivery system 305 can select and customize the context aware application before returning the application to the service provider 345. In some embodiments, the application delivery system 305 incorporates the selected context aware application into the content requested by the user to form customized content. The application delivery system 305 then delivers the customized content to the service provider 345 via the network 310, or the application delivery system 305 delivers the customized content directly to the user via the network 310. In some embodiments, the application delivery system 305 responds to requests for context aware applications from a predetermined service provider 345. In some embodiments, the application delivery system 305 responds to request from any service provider 345 that makes requests.

The network 310 system can be a single network or a combination of different networks. For example, a network can be a local area network (LAN), a wide area network (WAN), a public network, a private network, a proprietary network, a Public Telephone Switched Network (PSTN), the Internet, a wireless network, a virtual network, or any combination thereof. The network 310 comprises wired or wireless access points 315. The wired or wireless access points 315 allow a data source connect to the network 310 in order to transmit information via the network.

The users 320 may send requests to the service provider 345 via the network 310 and receive a request result from the service provider 345 through the network. The users 320 comprise a users connected to the network via desktop connections 325, users connecting to the network via wireless connections such as through a laptop 330, connecting to the network via a handheld device 335, and connecting to the network via a built-in device in a motor vehicle 340.

The service provider 345 receives the request for content from a user. The service provider 345 may provide the requested content to the user from content sources within the service provider 345, or the service provider 345 may retrieve the content requested from the content sources 350. The service provider 345 may combine content from more than one source to fulfill the request. The content requested by the user may be provided directly by the service provider 345 via the network 310, or may be provided to the user via the application delivery system 305, as discussed above. The service provider 345 may request a context aware application from the application delivery system 305, and incorporate the context aware application into the content requested by the user before sending the content to the user 320.

The content sources 350 may include multiple content sources 350-a, 350-b, . . . , 350-c and may correspond to a web page host corresponding to an entity. The web page host may be an individual, a business, or an organization such as USPTO.gov, a content provider such as cnn.com and Yahoo.com, or a content feed source such as tweeter or blogs. The service provider 345 may rely on such information to respond to a request from a user, for example, the service provider 345 may provide web content corresponding to the request and return the web content to the user.

Figure 4:
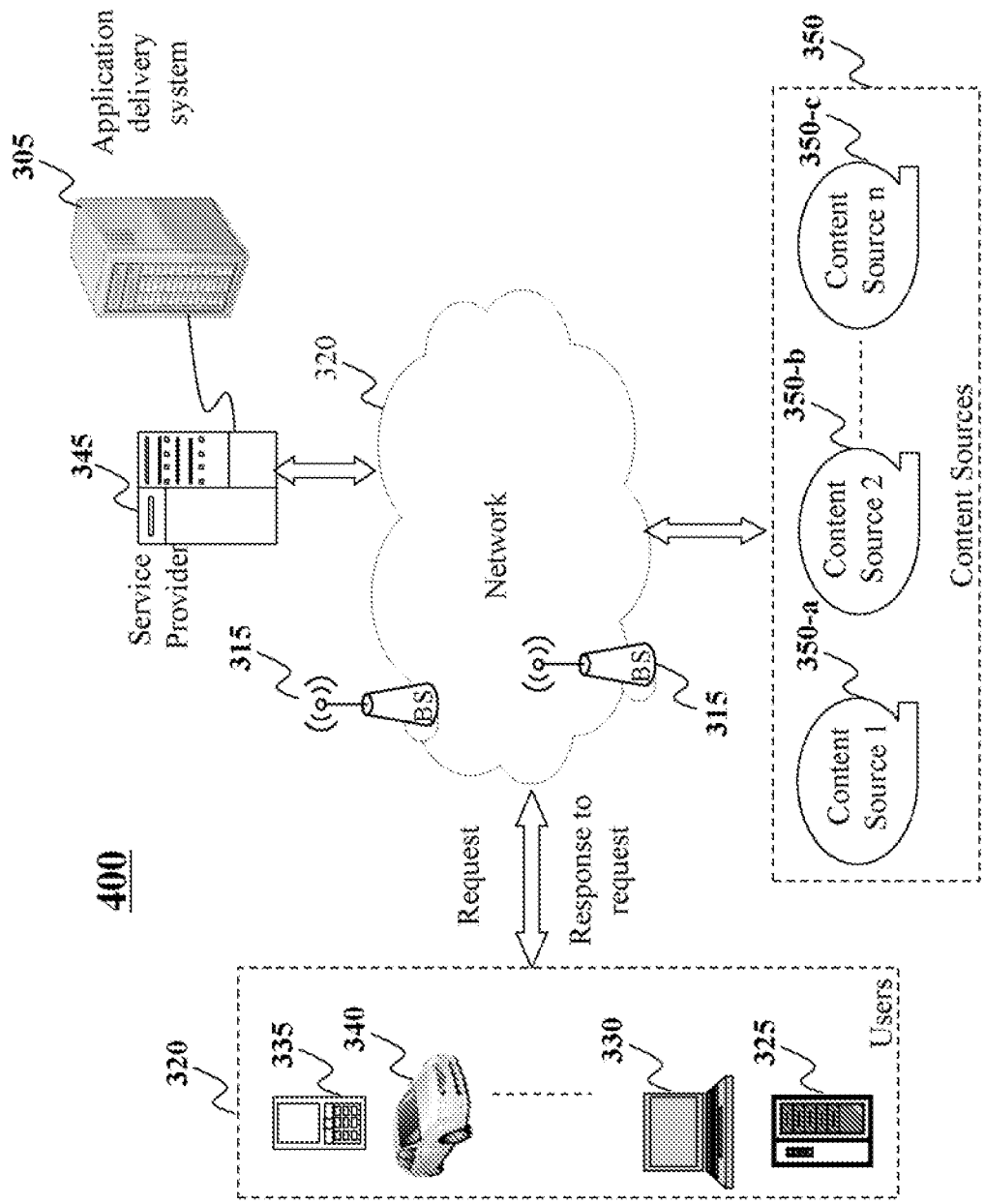
FIG. 4 illustrates a system including an application delivery system according to an embodiment.

FIG. 4 illustrates a system 400 including an application delivery system 305 according to an embodiment. The system 400 comprises an application delivery system 305, users 320, a network 310, a service provider 345, and content sources 350.

The system 400 allows users to send requests for content, for example, web pages to the service provider 345 via the network 310. The requests are received by the service provider 345. The service provider 345 responds to the requests by providing the requested content to the respective users via the network 310. The service provider 345 incorporates content obtained from the content sources 350 and the application delivery system 305.

The application delivery system 305 is connected to the service provider 345 and acts as a backend server to the service provider 345. The service provider 345 requests context aware applications from the application delivery system 305. The application delivery system 305 provides the context aware application to the service provider 345 based on the request from the service provider 345. In some embodiments, the service provider 345 forwards the content requested by the user to the application delivery system 305 so that the application delivery system 305 can select and customize the context aware application before returning the context aware application to the service provider 345. In some embodiments, the application delivery system 305 incorporates the selected context aware application into the content requested by the user to form customized content.

Figure 5:
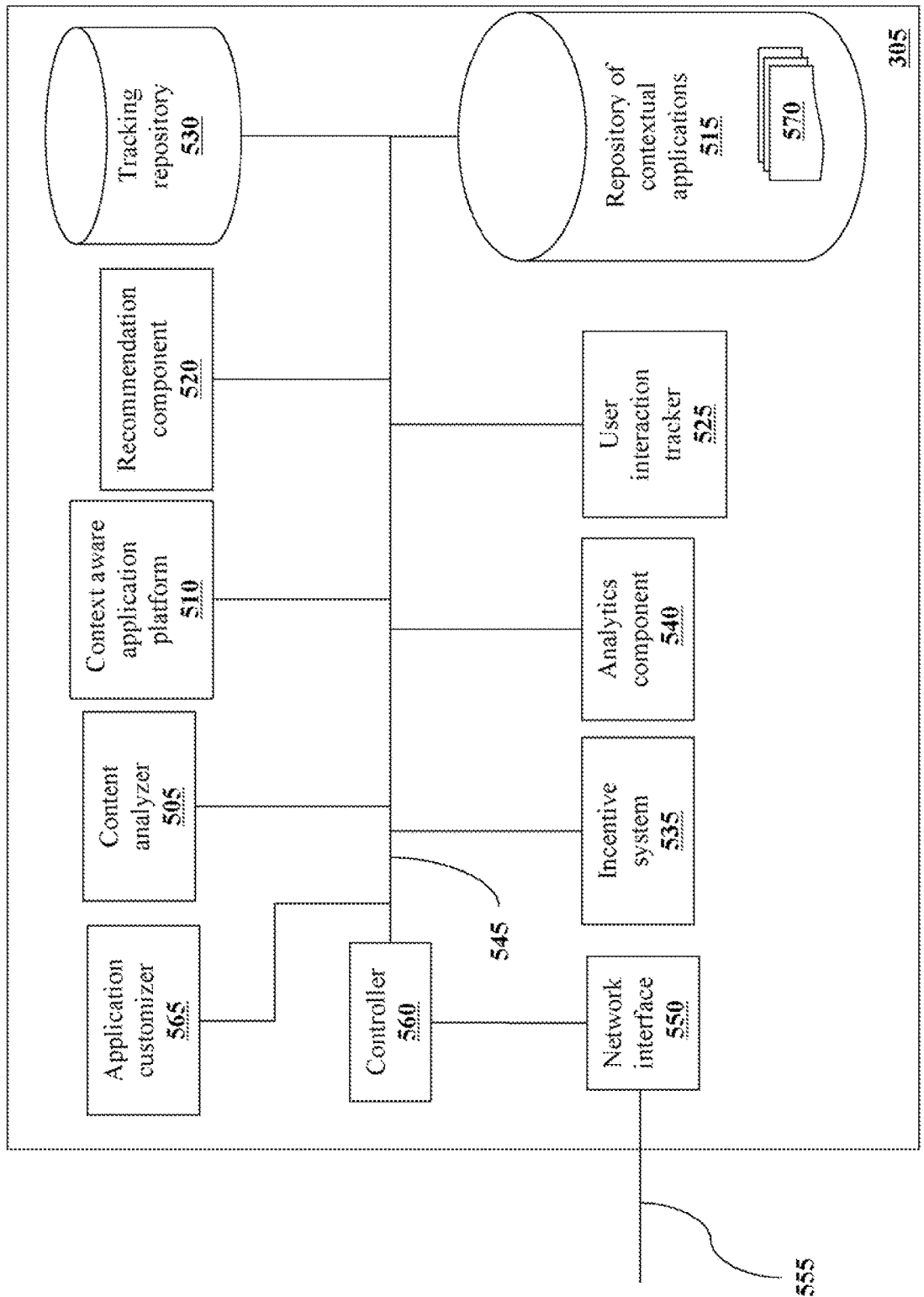
FIG. 5 illustrates an application delivery system for delivering context aware applications according to an embodiment.

FIG. 5 illustrates an application delivery system 305 for delivering context aware applications 570 according to an embodiment. The application delivery system 305 comprises a content analyzer 505, a context aware application platform 510, a repository of contextual applications 515, a recommendation component 520, a user interaction tracker 525, a tracking repository 530, an incentive system 535, an analytics component 540, an internal network 545, a network interface 550, an external network 555, a controller 560, and an application customizer 565.

The application delivery system 305 receives requests for context aware applications 570 from, for example, the service provider 345 or directly from a browser of one of the users 320. The application delivery system 305 selects and/or customizes the context aware applications 570, provides the customized context aware applications 570 to the requester and/or tracks the context aware applications 570, as discussed above.

The content analyzer 505 analyses content provided in the request to identify topics, subjects etc. in the content. For example, the content analyzer 505 may return a digest of a web page in the form of entities/concepts and categories, which are collectively called context.

The context aware application platform 510 provides common resources for use by context aware applications 570. The resources may comprise communication drivers, display and graphic resources, resources for splicing the application into a web page, resources for the context aware application 570 to interact with a user of a web page, resources for the context aware application 570 to communicate over the Internet, and with other applications and services.

In some embodiments, the context aware application 570 is a stand-alone script embedded in the web page 200 sent to the user, and the context aware application 570 calls and uses the resources provided by the context aware application platform 510 over the Internet or other network.

In some embodiments, the context aware application 570 is not sent to the browser of the user but only a script allowing display of the context aware application 570 and interaction with the user. The context aware application 570 runs on the application delivery system 305 as, for example, a JAVA™ Servlet. The context aware application 570 then directly uses the context aware application platform 510 on the application delivery system 305.

The repository of contextual applications 515 contains context aware applications 570 stored with meta-data that allows the material and subjects presented by the context aware applications 570 to be identified. Thus, for example, if the context aware application 570 were a weather application, the meta-data would contain information indicating that the context aware application 570 has weather content. The meta-data further indicates the kind of rewards available to the user from the context aware application 570. The rewards may comprise coupons, gift certificates, promotions, upgrades of context aware applications 570 etc.

The recommendation component 520 selects an appropriate context aware application 570 for the webpage requested by the user. In some embodiments, the selection of a context aware application 570 is based on the contents of the current webpage requested by the user. In some embodiments, the selection of a context aware application 570 is based on an output from the content analyzer 505. In some embodiments, the selection of a context aware application 570 is based on one or more of the identity of the user, the documented interests of the user, the natural language of the user, the physical location of the user, information regarding the social network of the user, etc. In some embodiments, the selection of a context aware application 570 is based on previous context aware applications 570 sent to the users 320 and the user's use of or performance in the previous context aware applications 570. In some embodiments, the selection of a context aware application 570 is based on the use of or performance of context aware applications 570 by other users in the user's social network, the user's demographic, the user's geographic area, the user's natural language group, etc. In some embodiments, the selection of a context aware application 570 is based on providing a continuation of a context aware application 570 that a user is currently using. In some embodiments, any combination with any weighting scheme can be used to select the context aware application 570 to send to the user.

The user interaction tracker 525 tracks the interactions of users with the context aware applications 570 that the users 320 have downloaded. Thus, for example, if a user downloads a game and plays the game, the context aware application 570 sends data indicating interactions of the user with the game to the user interaction tracker 525. The user interaction tracker 525 stores the data sent in the tracking repository 530. In some embodiments, the user interaction tracker 525 also stores content or links to content requested by a user in the tracking repository 530, for example, the content detailed in a request for a context aware application, or a request to customize an application. The user interaction tracker 525 sends events relevant to the incentive system 535 to the incentive system 535. Further, the interaction tracker tracks the current state of any context aware application 570. If a context aware application 570 is in use by a user, for example, a game is being played, or the user appears to be interacting with the context aware application 570, the interaction tracker marks the context aware application 570 as being in use. When new content is requested by the user, if the interaction tracker indicates that a context aware application 570 is in use, the application delivery system 305 may deliver the in use context aware application 570 in the state that context aware application 570 was when the previous page was left.

The tracking repository 530 stores the interactions of the users 320 with the context aware applications 570. The user interaction tracker 525 sends the interactions of users with the context aware applications 570 to the tracking repository 530 and the tracking repository 530 stores the interactions in accordance with the user and the context aware application 570. For example, an interaction may be stored in a hierarchical database under the user and the context aware application 570. Alternatively, the interaction may be stored in a folder of a filing system for the user that contains a folder for the context aware application 570. The tracking repository 530 may be queried by the incentive system 535, to determine a current value of an incentive package of the user.

The incentive system 535 keeps track of user history for each context aware application 570 that the user downloads and uses. For example, the incentive system 535 tracks the activity of the user by querying the tracking repository 530. The incentive system 535 tracks the state of the context aware application 570 with regard to each user. The state may include, for example, the current rewards accumulated for each context aware application 570, the usage of each context aware application 570, other users that use each context aware application 570 with a particular user. Thus, for example, the incentive system 535 may track which users use a context aware application 570 that enables a particular game to be played competitively. The incentive system 535 may track rankings of the players, or a history of scores for the players. Based on the tracking, and the meta-data for the context aware applications 570. The incentive system 535 may issues rewards such as coupons, gift certificates, promotions, upgrades of context aware applications 570 etc. to the user. In some embodiments, the incentive system 535 can be queried by contexts aware application running on a server or the browser of a user. The queries allow the context aware application 570 to determine information regarding the use of context aware applications 570 by other users, for example the scores of other users on a particular context aware application 570. Thus, a context aware game application can find the scores of users in the social network of the user in the same game and display those scores as an incentive for the user.

The analytics component 540 associates the performance of the context aware applications 570 with an entity/category. The analytics component may be used by the recommendation component 520 to suggest context aware applications 570. Further, based on the use of the context aware applications 570 by users, the analytics component 540 may update the relationships between the performance of the context aware applications 570 with the entity/categories.

The internal network 545 connects the various components of the application delivery system 305 to one another and to the service provider 345 via the network interface 550 and the external network. The network interface 550 the application delivery system 305 to the service provider 345 via the external network.

The controller 560 coordinates the activity of the content analyzer 505, the context aware application platform 510, the recommendation component 520, the user interaction tracker 525, the incentive system 535, the analytics component 540 the application customizer 565. The controller 560 further coordinates receiving requests for applications, and receiving of interaction data from applications, as well as sending of applications, incentive, and rewards.

The application customizer 565 customizes applications or context aware applications 570, if requested, based on topics provider by the content analyzer 505. In some embodiments, the applications or context aware applications 570 are adapted to self-customize based on topics provided by the content analyzer 505. In some embodiments the application or context aware application 570 are adapted to analyze the content of the web page 200 in which the application or context aware application 570 is embedded.

Figure 6A:
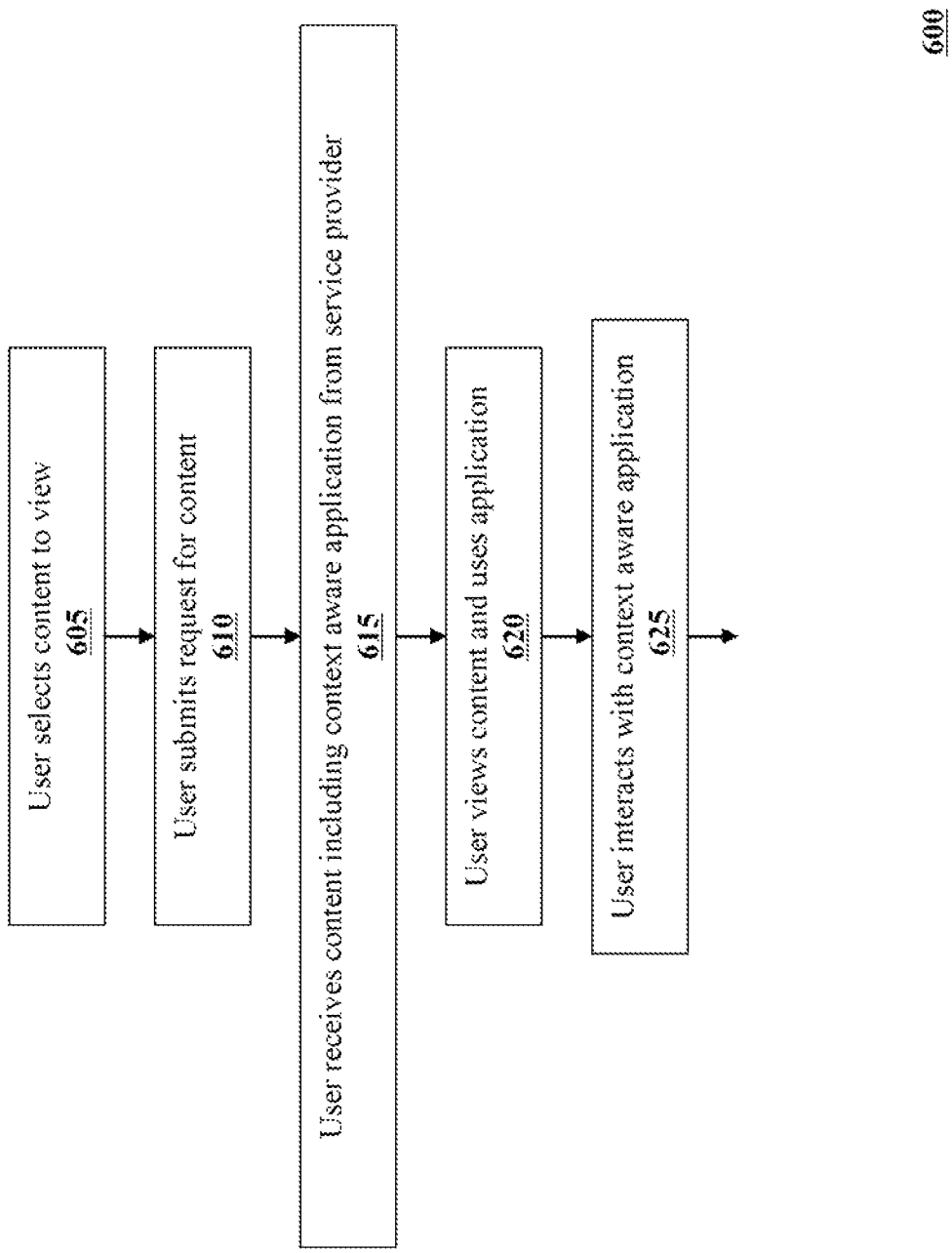
FIG. 6A-B depicts a flow chart for a method of a user to receive a context aware application according to an embodiment.
Figure 6B:
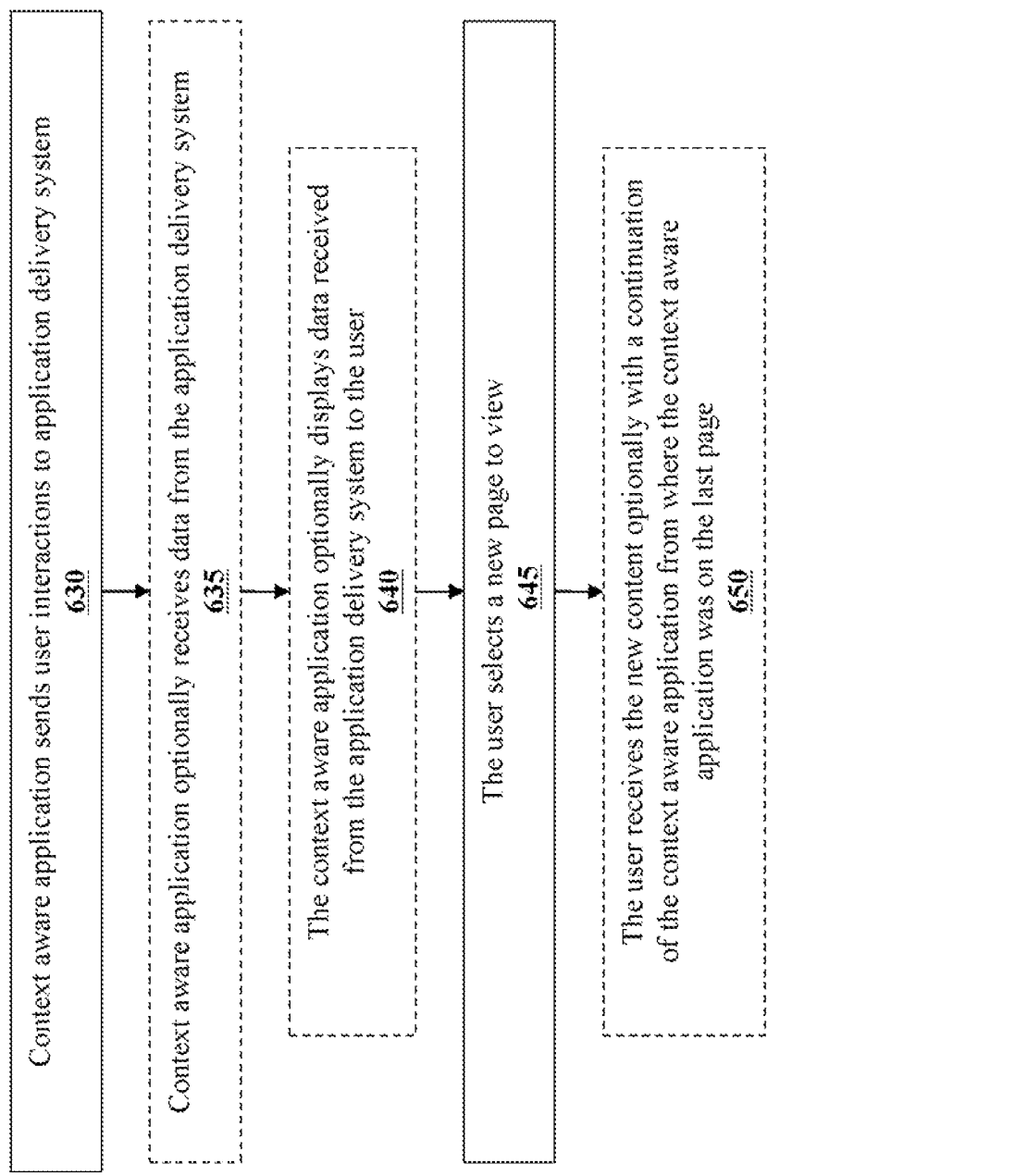

FIG. 6A-B depicts a flow chart for a method 600 of a user to receive a context aware application 570 according to an embodiment. The method 600 begins at step 605. At step 605, the user selects content to view. The request may be made by the user typing an internet address into a browser, clicking a link on a webpage, scanning a bar code or quick response (QR) code, inputting a search request, etc. At step 610, the user submits the request for content.

At step 615, the user receives the content requested including a context aware application 570 from the service provider 345. In some embodiments, the context aware application 570 may be placed in the body of the content, for example a web page. In some embodiments, the context aware application 570 may be placed in a separate web page as for example a new tab in a browser or a popup over the browser. In some embodiments, the browser of the user may have to request separately the context aware application 570 from the application delivery system 305 based on a link inserted in the content. In some embodiments, the context aware application 570 does not run in the user's 320 browser but runs as an application on the application delivery system 305. In these embodiments, the browser merely acts as a means to view the application, and deliver user actions to the context aware application 570 running on the application delivery system 305.

At step 620, the user 320 views the content and the context aware application 570. At step 625, the user interacts with the context aware application 570. If the user is interested in the context aware application 570, the user may interact with the context aware application 570. The context aware application 570 may be for example a game that the user can play, for example, the word game context aware application 110, an informative application, for example, the poll/vote context aware application 205, or any other context aware application 570.

At step 630, the context aware application 570 sends the user interactions to the application delivery system 305. As the user interacts with the application by, for example, clicking buttons, dragging features, etc. the interactions are sent to the application delivery system 305 for analysis and storage.

At step 635, the context aware application 570 optionally receives data from the application delivery system 305. Depending upon the kind of context aware application 570, the context aware application 570 may receive data from the application delivery system 305. The data may be based on the interaction of the user with the context aware application 570, the interactions of other users with the context aware application 570 running on the browsers of those users, the time, the location of the user, etc. For example, the context aware application 570 may receive high scores of other users, information regarding achievements of other users, etc.

At step 640, the context aware application 570 optionally displays data received from the application delivery system 305 to the user. The context aware application 570 may display the information received from the application delivery system 305 in the form of, for example, a high score table or as actions by another user. For example, if a game is being played, moves by another player maybe displayed by the context aware application 570 based on the data sent by the application delivery system 305. Further, the data may cause the application to move to a different phase of a game or process, or display rewards such as coupons, gift certificates, promotions, upgrades of context aware applications 570 etc. for use by the user.

At step 645, the user selects a new page to view. At step 650, the user receives the new content with optionally a continuation of the context aware application 570 from where the context aware application 570 was on the last page. Providing a continuation of the context aware application 570 from where the context aware application 570 was on the last page allows the user to browse while continuing to use the context aware application 570 uninterrupted.

Figure 7:
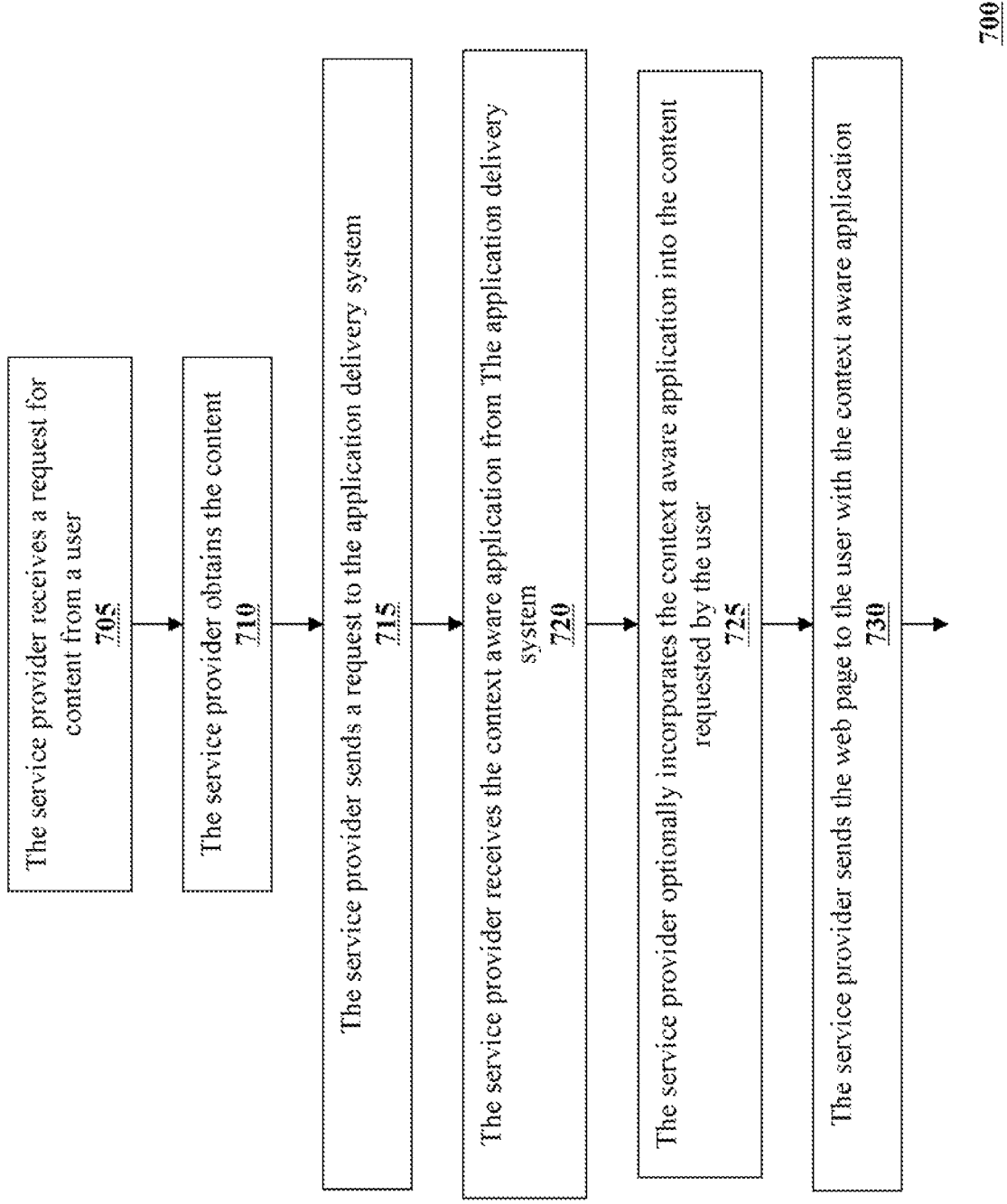
FIG. 7 depicts a flow chart for a method of providing a context aware application by a service provider according to an embodiment.

FIG. 7 depicts a flow chart for a method 700 of providing a context aware application 570 by a service provider 345 according to an embodiment. The method 700 begins at step 705. At step 705, the service provider 345 receives a request for content from a user.

At step 710, the service provider 345 obtains the content. The content may be content on the service the servers of the service provider 345, in which case the service provider 345 obtains the content from the server. The service provider 345 may obtain the content from a one of the content sources 350 on the network 310.

At step 715, the service provider 345 sends a request to the application delivery system 305. The request includes the content requested by the user or a link to the content so that the application delivery system 305 can select an appropriate context aware application 570.

At step 720, the service provider 345 receives the context aware application 570 from the application delivery system 305. As noted above, in some embodiments, the application delivery system 305 delivers the context aware application 570 already embedded in the content. In some embodiments, the service provider 345 receives the context aware application 570, not embedded in the content.

At step 725, the service provider 345 optionally incorporates the context aware application 570 into the content requested by the user. In embodiments where the service provider 345 receives the context aware application 570, not embedded in the content, the service provider 345 embeds the context aware application 570 in the content. In some embodiments, the service provider 345 receives a link or reference to the context aware application 570 to embed in the content. When sent to the user, the link may be used by the user's 320 browser to either download the context aware application 570 from the application delivery system 305 directly, or as a means to run the context aware application 570 on the application delivery system 305, with the user's browser, providing the display and control of the context aware application 570 via the network 310.

At step 730, the service provider 345 sends the content to the user with the context aware application 570.

Figure 8:
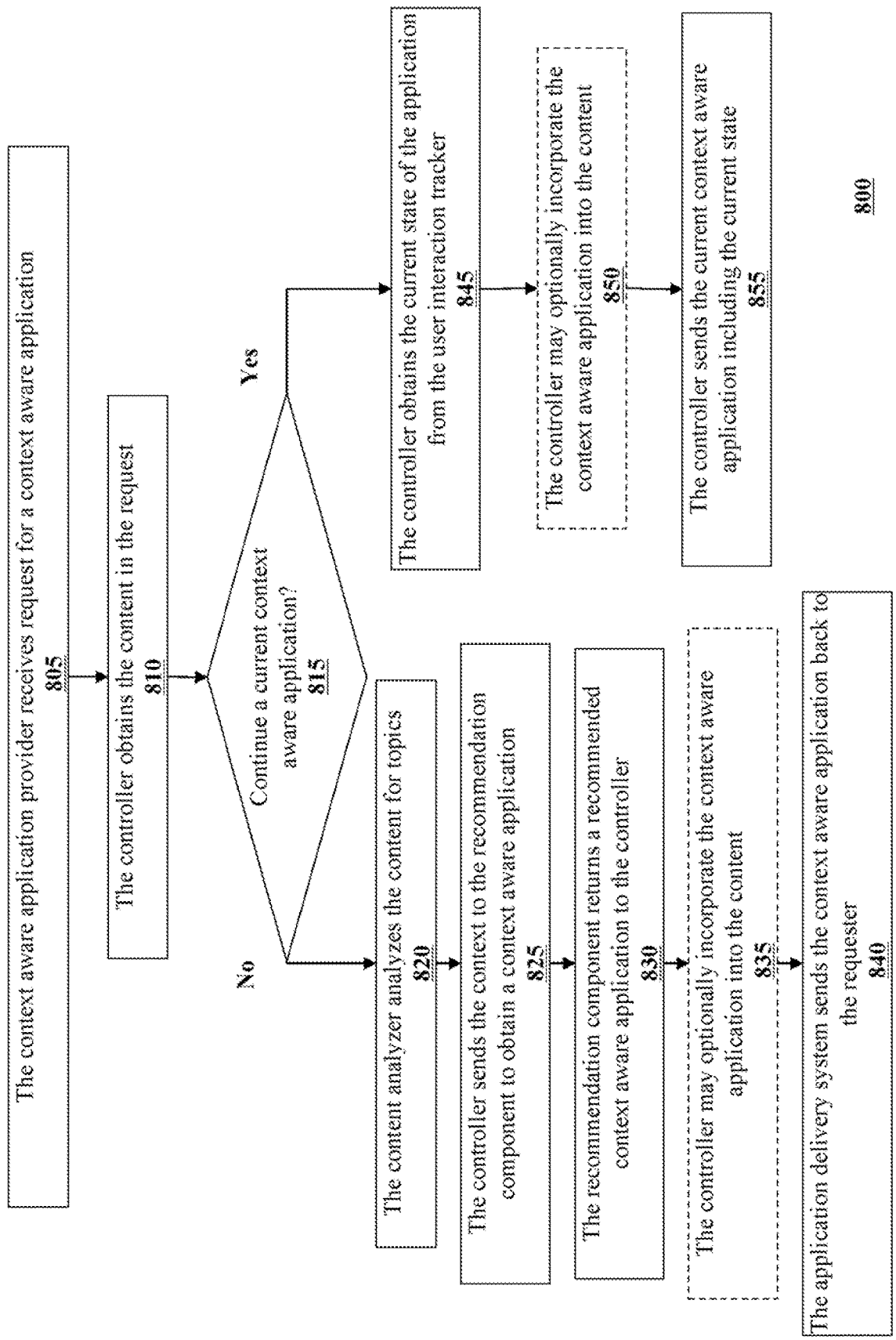
FIG. 8 depicts a flow chart for a method of providing a context aware application according to an embodiment.

FIG. 8 depicts a flow chart for a method 800 of providing a context aware application 570 according to an embodiment. The method 800 begins at step 805. At step 805, the application delivery system 305 receives request for a context aware application 570. The request for the context aware application 570 is received via the external network 555 and the network interface 550. In some embodiments, the request for the context aware application 570 is received from a service provider 345 over the Internet. In some embodiments, the request for context aware application 570 is received from the service provider 345 via a private network. The request for the context aware application 570 includes either the content into which the context aware application 570 is to be placed, or a link to the content into which the context aware application 570 is to be placed. In some embodiments, information detailing the request and the content requested is stored in the tracking repository 530, by the user interaction tracker 525.

At step 810, the controller 560 obtains the content in the request. In some embodiments, the content is provided by a service provider, for example, service provider 345 that originally received the request and forwarded the request with the content to the application delivery system 305. The controller 560 extracts the content and forwards the content to the content analyzer 505. In some embodiments, a link to the content is provided by a service provider 345 that originally received the request and forwarded the request with the content to the application delivery system 305. The controller 560 extracts the link and retrieves the content based on the link. The controller 560 forwards the content to the content analyzer 505. Alternatively, the controller 560 may forward the link to the content analyzer 505 for the content analyzer 505 to obtain the content directly. In some embodiments, the content is obtained by the application delivery system 305 based on the request sent directly by a browser of a user.

At step 815, the controller 560 checks to see if a current context aware application 570 should be continued by checking the current state of context aware applications 570 for the user. If the context aware application should be continued, the method proceeds to step 845. If a new context aware application is to be obtained, the method proceeds to step 820.

At step 820, the content analyzer analyzes the content for topics. In some embodiments, the content analyzer 505 searches the content for keywords or phrases. In some embodiments, the content analyzer 505 extracts topics from the content based on analysis of other content requested by the same user and the current content requested by the user. In some embodiments, the content analyzer 505 extracts topics from the content based on analysis of documents requested by more than one user and comparisons of the words and phrases in all of the above documents. In some embodiments, the analysis of the content is based on a statistical analysis of the words and phrases in the content requested and content requested at other times. The content analyzer 505 generates a digest of the content in the form of keywords, entities/concepts and/or categories, which are collectively called the context.

At step 825, the controller 560 sends the context to the recommendation component 520 to obtain a context aware application 570. The recommendation component 520 selects a context aware application 570 from the repository of contextual applications 515 based on the context. For example, if the context includes a particular celebrity, the recommendation component 520 may select the word game context aware application 110. The recommendation component 520 may use the analytics component 540 provide for relationships to entities/concepts.

At step 830, the recommendation component returns a recommended context aware application 570 to the controller 560. In some embodiments, the recommendation component 520 sends a reference link, corresponding to the context aware application 570. In some embodiments, the recommendation component 520 sends the context aware application 570 to the controller 560.

At step 835, the controller 560 may optionally incorporate the context aware application 570 into the content. In some embodiments, the controller 560 of the application delivery system 305 is capable of incorporating the context aware application 570 in an appropriate place in the content. If necessary, the controller 560 downloads the content and incorporates the context aware application 570.

At step 840, the application delivery system 305 sends the context aware application 570 back to the requester. In embodiments where the application delivery system 305 incorporates the context aware application 570 into the content, the application delivery system 305 sends the content, including the context aware application 570. In embodiments where the application delivery system 305 does not incorporate the context aware application 570 into the content, the application delivery system 305 sends the context aware application 570 to the requester. In embodiments where the application delivery system 305 will run the context aware application 570 for the user on a server of the application delivery system 305, the application delivery system 305 sends a link or reference for the context aware application 570 to the requester. In some embodiments, the link or reference to the context aware application 570 is embedded in the content and send to the requester. In some embodiments, information detailing the sent context aware application is stored in the tracking repository 530, by the user interaction tracker 525.

At step 845, the controller 560 obtains the current state of the application from the user interaction tracker.

At step 850, the controller 560 may optionally incorporate the context aware application 570 into the content. In some embodiments, the controller 560 of the application delivery system 305 is capable of incorporating the context aware application 570 in an appropriate place in the content. If necessary, the controller 560 downloads the content and incorporates the context aware application 570.

At step 855, the controller 560 sends the current context aware application 570 including the current state of the current context aware application 570 to the requester. In some embodiments, information detailing the current context aware application and the state is stored in the tracking repository 530, by the user interaction tracker 525.

Figure 9:
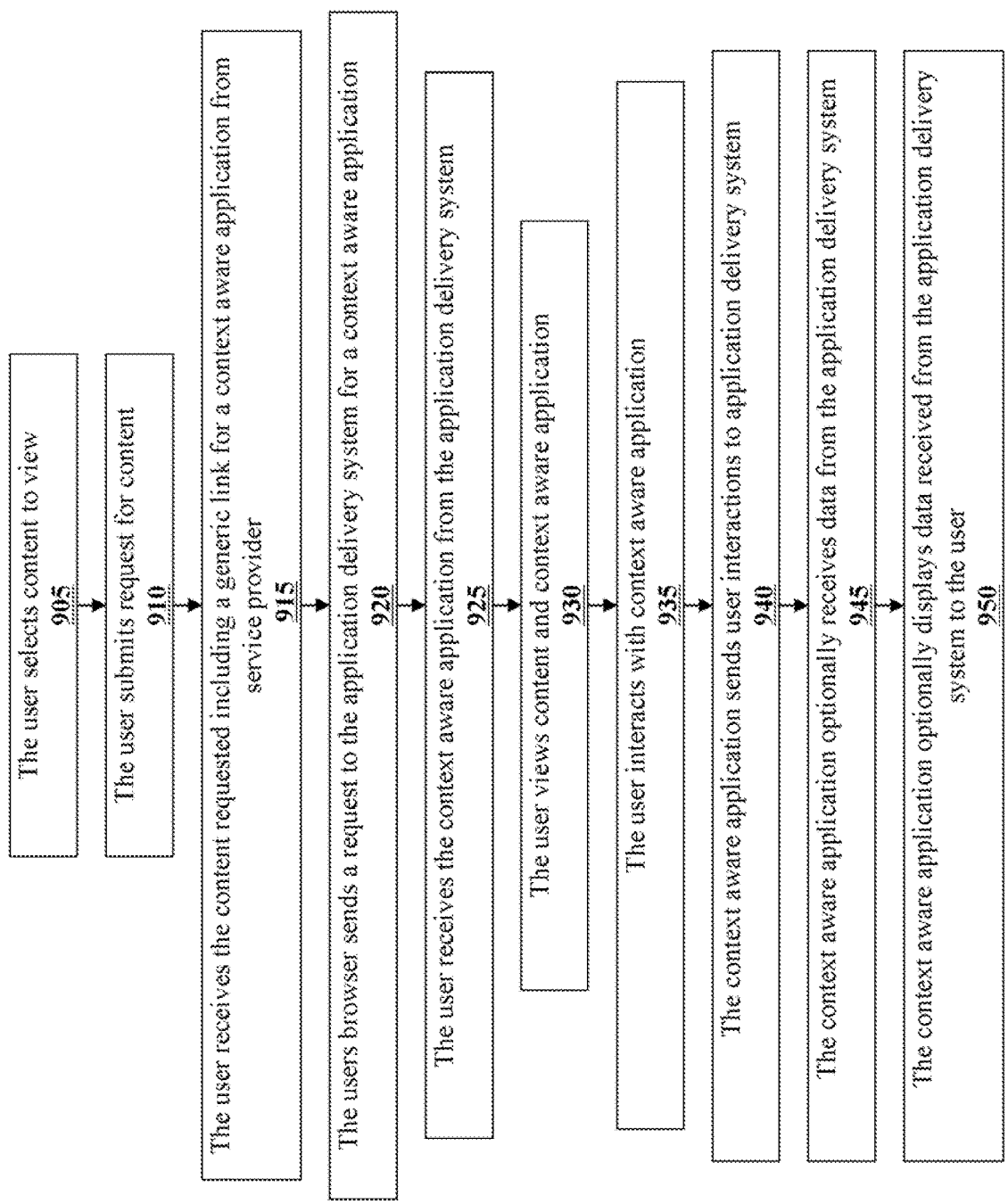
FIG. 9 depicts a flow chart for a method of a user to receive a context aware application according to an embodiment.

FIG. 9 depicts a flow chart for a method 900 of a user to receive a context aware application 570 according to an embodiment. The method 900 begins at step 905. At step 905, the user selects content to view. The selection may be made by the user typing an internet address into a browser, clicking a link on a webpage, scanning a bar code or quick response (QR) code, inputting a search request, etc. At step 910, the user submits request for content to the service provider 345.

At step 915, the user receives the content requested including a generic link for a context aware application 570 from the service provider 345. In some embodiments, the context aware application 570 may be placed in the body of the content, for example a web page. In some embodiments, the context aware application 570 may be placed in a separate web page as for example a new tab in a browser or a popup over the browser. In some embodiments, the context aware application 570 does not run in the user's browser that runs as an application on the application delivery system 305. In these embodiments, the browser merely acts as a means to view the application, and deliver user actions to the context aware application 570 running on the application delivery system 305.

At step 920, the user's browser sends a request to the application delivery system 305 for a context aware application 570. The request for the context aware application 570 includes the content sent to the user by the service provider 345 or a link to that content. The request to the application delivery system 305 is based on the generic link to the application delivery system 305 embedded in the content sent to the user.

At step 925, the user receives the context aware application 570 from the application delivery system 305. At step 930, the user views the content and the context aware application 570.

At step 935, the user interacts with the context aware application 570. If the user is interested in the context aware application 570, the user may interact with the context aware application 570. The context aware application 570 may be, for example, a game that the user can play, such as, the word game context aware application 110, an informative application, such as, the poll/vote context aware application 205, or any other context aware application 570.

At step 940, the context aware application 570 sends user interactions to application delivery system 305. As the user interacts with the application by, for example, clicking buttons, dragging features, etc. the interactions are sent to the application delivery system 305 for analysis and storage.

At step 945, the context aware application 570 optionally receives data from the application delivery system 305. Depending upon the kind of context aware application 570, the context aware application 570 may receive data from the application delivery system 305. The data may be based on the interaction of the user with the context aware application 570, the interactions of other users with the context aware application 570 running on the browsers of those users, the time, the location of the user etc. For example, context aware application 570 may receive high scores of other users, information regarding achievements of other users, etc.

At step 950, the context aware application 570 optionally displays data received from the application delivery system 305 to the user. The context aware application 570 may display the information received from the application delivery system 305 in the form of, for example, a high score table or as actions by another user. For example, if a game is being played, moves by another player maybe displayed by the context aware application 570 based on the data sent by the applicant delivery system.

Figure 10:
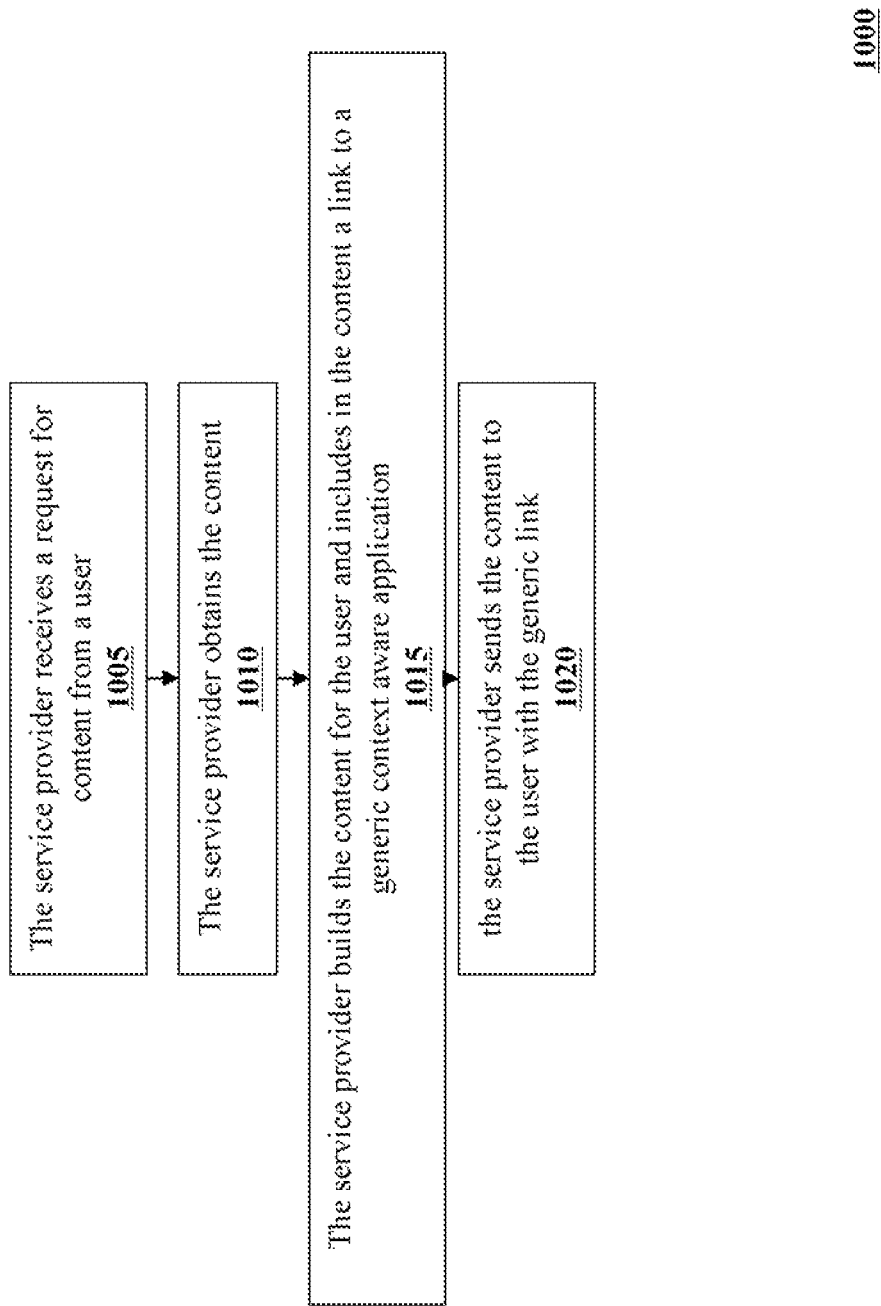
FIG. 10 depicts a flow chart for a method of providing a context aware application by a service provider according to an embodiment.

FIG. 10 depicts a flow chart for a method 1000 of providing a context aware application 570 by a service provider 345 according to an embodiment. The method 1000 begins at step 1005. At step 1005, the service provider 345 receives a request for content from a user.

At step 1010, the service provider 345 obtains the content. The content may be content on the servers of the service provider 345, in which case the service provider 345 obtains the content from the server. The service provider 345 may obtain the content from a one of the content sources 350 on the network 310.

At step 1015, the service provider 345 builds the content for the user and includes in the content a link to generic context aware application 570. The generic link is a link that requests a context aware application 570 from the application delivery system 305. The generic link may be in an HTML element inserted in the content so as to provide a space on the web page 200 for the context aware application 570 to be inserted.

At step 1020, the service provider 345 sends the content to the user with the generic link. When the browser of the user receives the content and the generic link, the browser displays the content and requests the context aware application 570 from the application delivery system 305 using the generic link. The request may include the content or a link to the content so that the application delivery system 305 is able to select the context aware application 570 based on the content.

Figure 11:
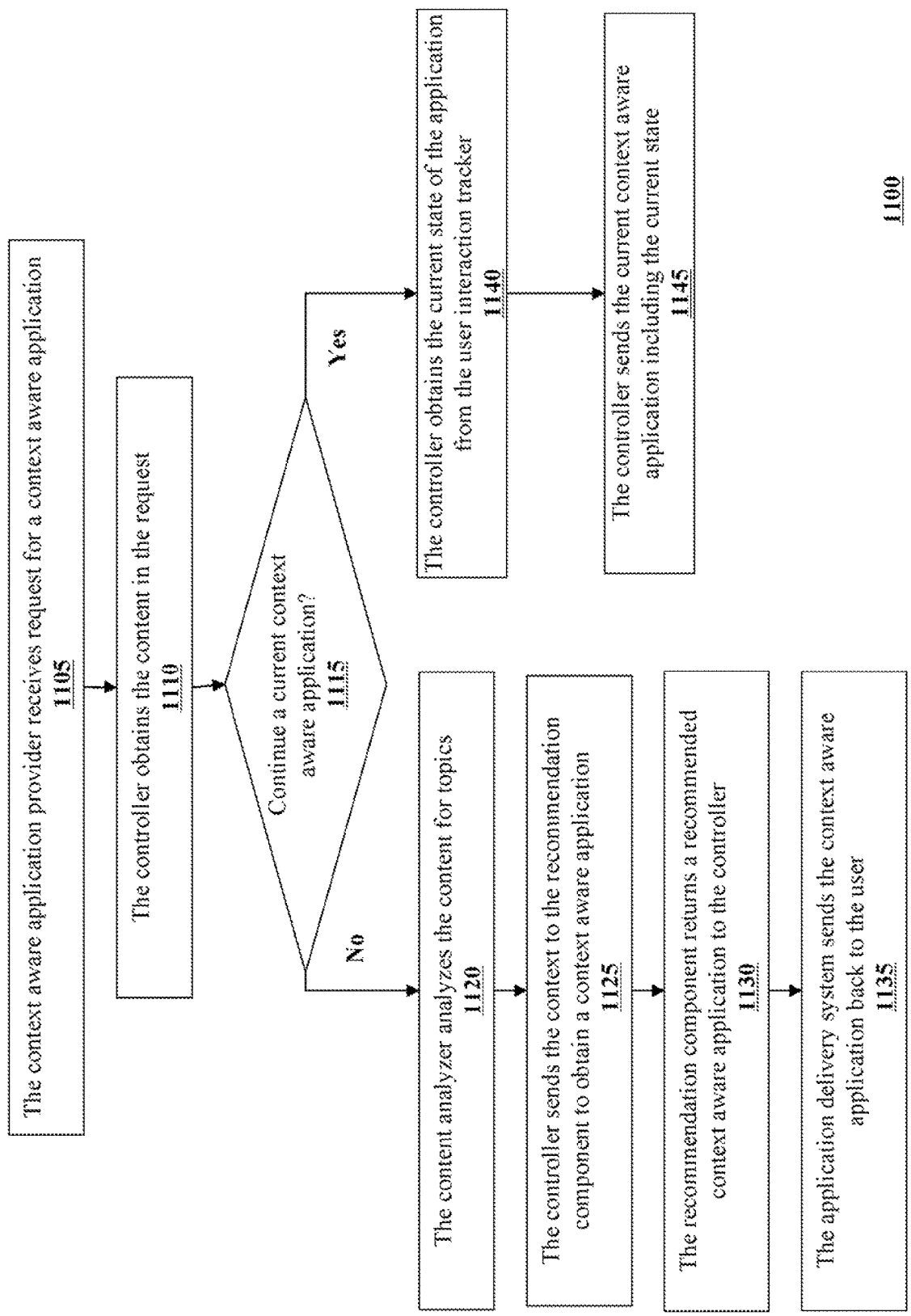
FIG. 11 depicts a flow chart for a method of providing a context aware application according to an embodiment.

FIG. 11 depicts a flow chart for a method 1100 of providing a context aware application 570 according to an embodiment. The method 1100 begins at step 1105. At step 1105, the context aware application provider receives request a for a context aware application 570. The request for context aware application 570 is received via the external network 555 and the network interface 550. The request for the context aware application 570 is received from the browser of the user via the network 310, based on a generic link to the application delivery system 305 provided in content sent to the user. The request for the context aware application 570 includes either the content into which the context aware application 570 is to be placed or a link to the content into which the context aware application 570 is to be placed. In some embodiments, information detailing the request and the content requested is stored in the tracking repository 530, by the user interaction tracker 525.

At step 1110, the controller 560 obtains the content in the request. The controller 560 either extracts the content and forwards the content to the content analyzer 505 or the controller 560 extracts the link and retrieves the content based on the link. The controller 560 forwards the content to the content analyzer 505. Alternatively, the controller 560 may forward the link to the content analyzer 505 for the content analyzer 505 to obtain the content directly.

At step 1115, the controller 560 checks to see if a current context aware application 570 should be continued by checking the current state of context aware applications 570 for the user. If the context aware application should be continued, the method proceeds to step 1140. If a new context aware application is to be obtained, the method proceeds to step 1120.

At step 1120, the content analyzer analyzes the content for topics. In some embodiments, the content analyzer searches the content for keywords or phrases. In some embodiments, the content analyzer extracts topics from the content based on analysis of other content requested by the same user and the current content requested by the user. In some embodiments, the content analyzer extracts topics from the content based on analysis of documents requested by more than one user and comparisons of the words and phrases in all of the above documents. In some embodiments, the analysis of the content is based on a statistical analysis of the words and phrases in the content requested and content requested at other times. The content analyzer 505 generates a digest of the content in the form of keywords, entities/concepts and/or categories, which are collectively called the context.

When the content analyzer 505 has completed analyzing the content, the content analyzer sends the context to the recommendation component 520. At step 1125, the controller 560 sends the context to the recommendation component to obtain a context aware application 570. The recommendation component 520 selects a context aware application 570 from the repository of contextual applications 515 based on the context. For example, if the context includes a particular celebrity, the recommendation component 520 may select the word game context aware application 110.

At step 1130, the recommendation component returns a recommended context aware application 570 to the controller 560. In some embodiments, the recommendation component 520 sends a reference link, corresponding to the context aware application 570. In some embodiments, the recommendation component 520 sends the context aware application 570 to the controller 560.

At step 1140, the controller 560 obtains the current state of the application from the user interaction tracker. At step 1145, the controller 560 sends the current context aware application 570 including the current state of the current context aware application 570 to the requester. In some embodiments, information detailing the current context aware application and the state is stored in the tracking repository 530, by the user interaction tracker 525.

At step 1135, the application delivery system 305 sends the context aware application 570 to the user. The application delivery system 305 sends the context aware application 570 to the requester. In embodiments where the application delivery system 305 will run the context aware application 570 for the user on a server of the application delivery system 305, the application delivery system 305 sends a link or reference to the context aware application 570 to the requester. In some embodiments, information detailing the context aware application is stored in the tracking repository 530, by the user interaction tracker 525.

Figure 12:
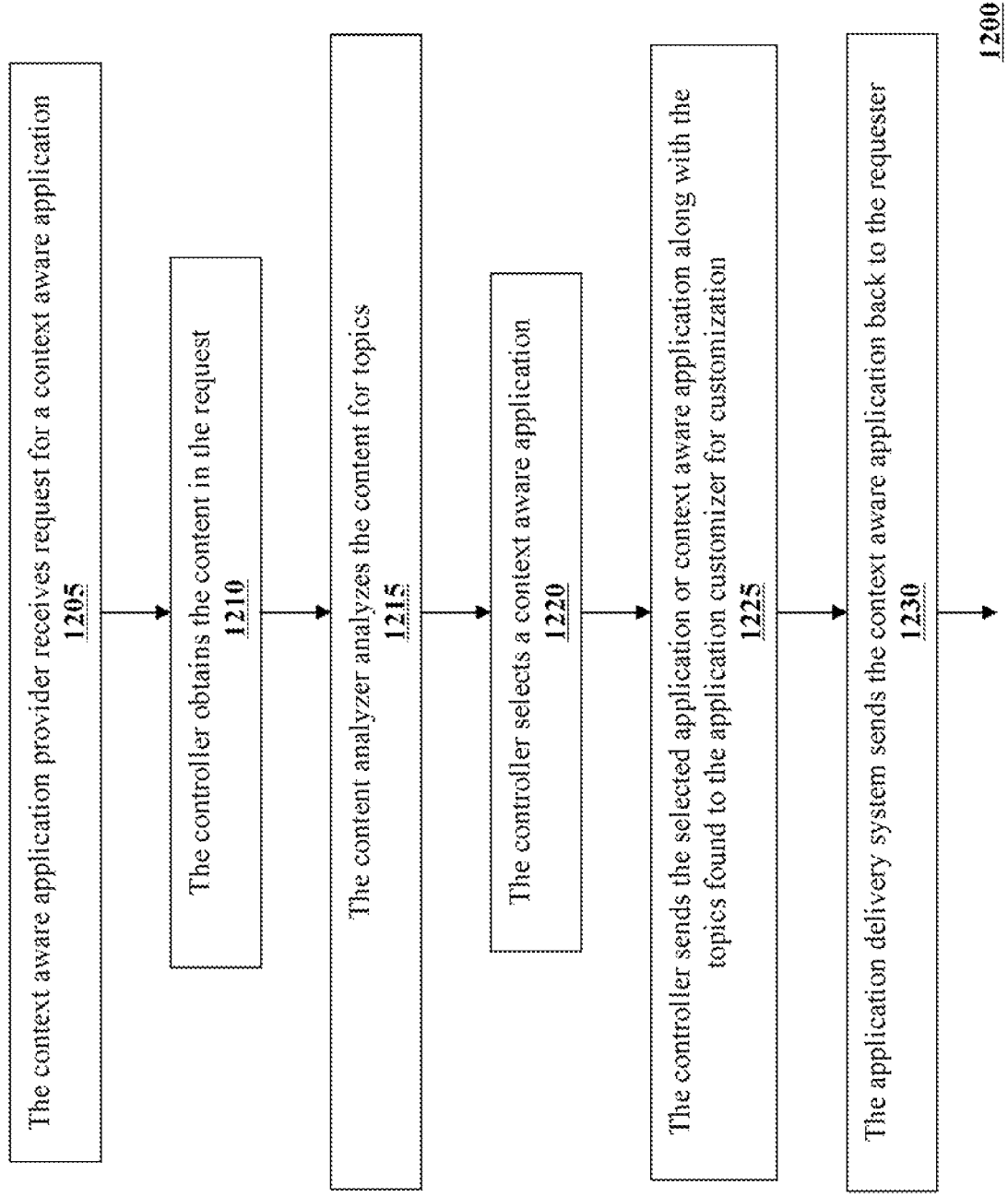
FIG. 12 depicts a flow chart for a method of customizing an application embedded in a web page based on the content of the web page according to an embodiment.

FIG. 12 depicts a flow chart for a method 1200 of customizing an application embedded in a web page based on the content of the web page according to an embodiment.

In some embodiments, the application delivery system 305 adapts applications embedded in web pages based on the content of the web page. In some embodiments, the application embedded in the web page uses resources in the context aware application platform 510 to adapt/customize the application to the content in the web page. The application may be selected by the recommendation component 520 or may be an application requested by the service provider 345. Thus, an application may be considered a context aware application 570 because the application was selected for the context in which the application is placed, or because the function of the application is adapted for the context in which the application is placed. An application may also be context aware, because of being selected for the context, and adapted for the context. Thus, the methods described in FIGS. 6-11 may be used in combination with or separately from the methods described in FIGS. 10-12. The method 1200 begins at step 1205. At step 1205, the context aware application provider receives request for a context aware application 570. The request may be the same as the request for a context aware application 570 in FIG. 8 or FIG. 11. However, the request may also include a request for a specific context aware application 570 as well as the content requested or a link to the content requested.

At step 1210, the controller 560 obtains the content in the request. If the content has already been obtained by the controller 560 to determine the specific context aware application 570, then the controller 560 uses the already obtained content.

At step 1215, the content analyzer analyzes the content for topics. In some embodiments, the content analyzer searches the content for keywords or phrases. In some embodiments, the content analyzer extracts topics from the content based on analysis of other content requested by the same user and the current content requested by the user. In some embodiments, the content analyzer extracts topics from the content based on analysis of documents requested by more than one user and comparisons of the words and phrases in all of the above documents. In some embodiments, the analysis of the content is based on a statistical analysis of the words and phrases in the content requested and content requested at other times. The content analyzer 505 generates a digest of the content in the form of keywords, entities/concepts, and/or categories, which are collectively called the context.

When the content analyzer 505 has completed analyzing the content, the content analyzer sends the context to the recommendation component 520.

If the content has already been analyzed by the content analyzer 505 to determine the topics to select a particular context aware application 570, the application delivery system 305 may use the previously determined topics. In some embodiments, the content analyzer 505 may be requested to change the analysis when finding content to customize an application or a context aware application 570. Further, in some embodiments, a second content analyzer may be added to the application delivery system 305 specifically for finding topics for customizing an application or context aware application 570. In particular, to customize an application or context aware application 570 may require far more detailed analysis and more topics to be produced. Topics for selecting a context aware application 570 may be more general because the selected application needs to fit with the overall context of the content rather than with the details.

At step 1220, the controller 560 selects a context aware application 570. If the application or context aware application 570 was specified by the service provider 345 or the user, the controller 560 does not send the context to the recommendation component 520 to obtain a context aware application 570. If an application or context aware application 570 is not specified by the service provider 345 or the user, the controller 560 uses, for example, method step 825 or method step 1120-1125 to obtain a context aware application 570.

At step 1225, the controller 560 sends the selected application or context aware application 570 along with the topics found to the application customizer for customization. The customization may include, for example, changing a list of words used by the application or some other data file used by the application to correspond to the topics. For example, the word game context aware application 110 may have a word list for the user to guess based on the topics or, for example, the poll/vote context aware application 205 may have the subject to be voted on the based on the topics. Further, the operation of an application may be customized based on the topics. For example, in the poll/vote context aware application 205, the type of voting may change based on topics. The type of voting might be, for example, a proportional voting system, a first past the post voting system, the transferable vote voting system, etc. In some embodiments, any manner to customize an application based on the topics is within the scope of embodiments of the disclosure.

At step 1230, the application delivery system 305 sends the context aware application 570 back to the requester.

Figure 13:
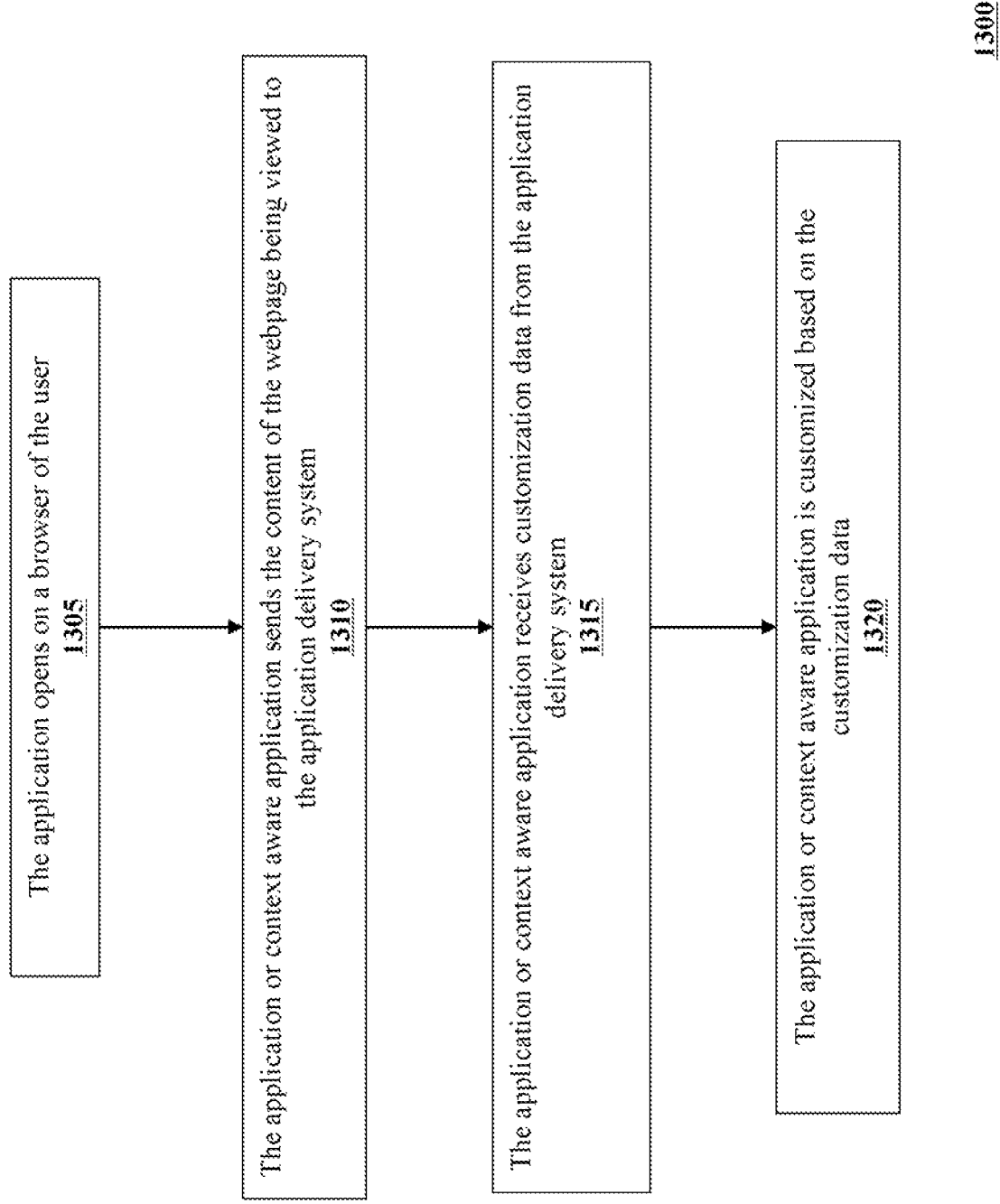
FIG. 13 depicts a flow chart for an alternative method of customizing an application embedded in a web page based on the content of the web page according to an embodiment.

FIG. 13 depicts a flow chart for an alternative method 1300 of customizing an application embedded in a web page based on the content of the web page according to an embodiment. The alternative method for customizing an application, is based on the application being customized when the application is already open at the browser of the user. When the application opens on the browser of the user, the application sends content information of the webpage being viewed by the user to the application delivery system 305, and based on the information sent the application is adapted. The method 1300 begins at step 1305. At step 1305, the application opens on a browser of the user. The application may be an application that is customizable, or a context aware application 570 that is customizable. The application may be running on the browser of the user, or the application may be running on a server of the application delivery system 305, with the browser of the user providing an interface to the user.

At step 1310, the application or context aware application 570 sends the content of the webpage being viewed to the application delivery system 305. The content may be sent to the application delivery system 305, or alternatively a link to the content may be sent to the application delivery system 305. At step 1315, the application or context aware application 570 receives customization data from the application delivery system 305.

At step 1320, the application or context aware application 570 is customized based on the customization data. In some embodiments, the application or context aware application 570 is self-customized. The application or context aware application 570 incorporates the customization data and the application or context aware application 570 runs in a manner corresponding to the customization data. In some embodiments, the application or context aware application 570 uses the context aware application platform 510 for customization. The application or context aware application 570 relies on the context aware application platform 510 for instructions regarding how to customize the manner in which the application or customized application runs.

Figure 14:
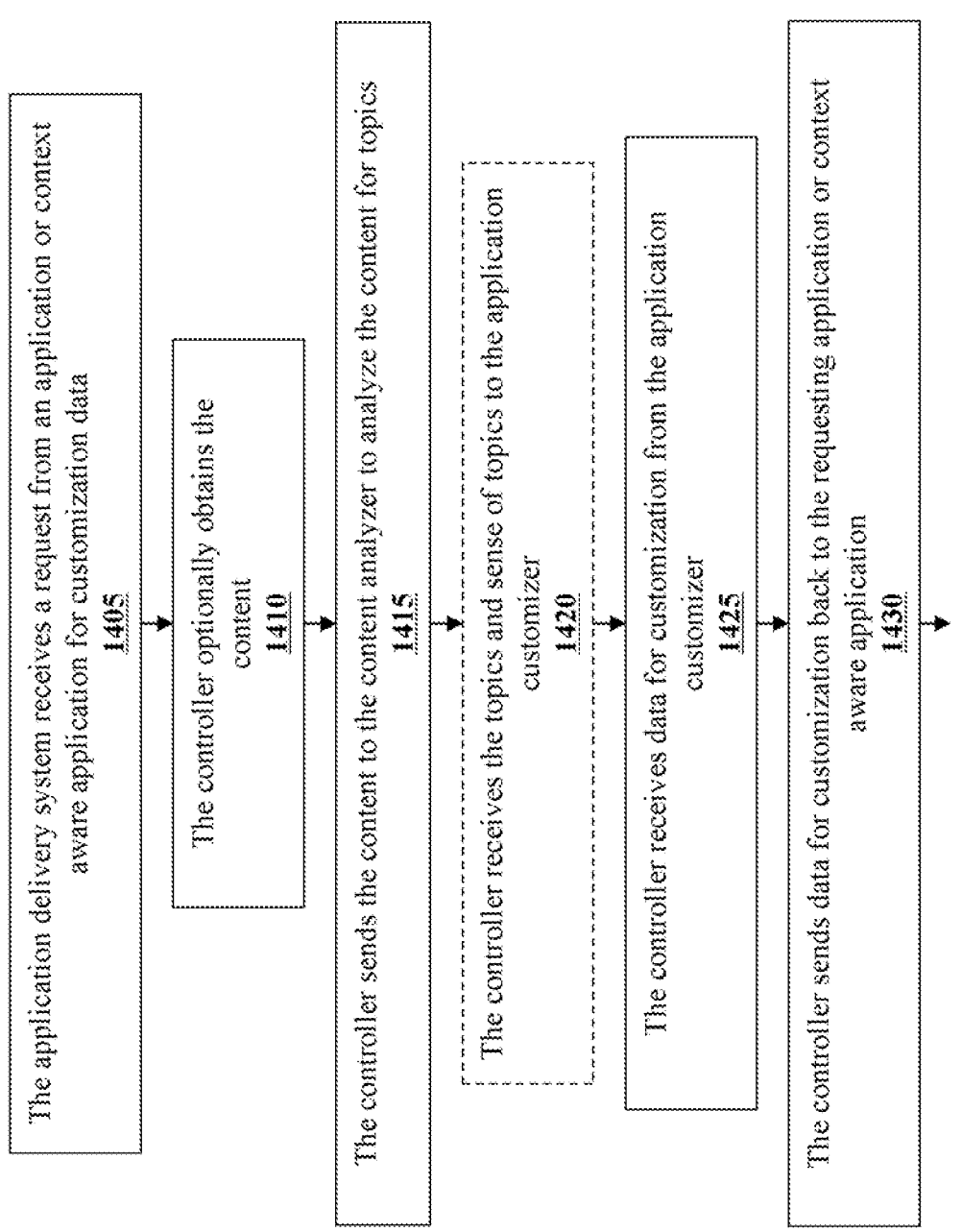
FIG. 14 depicts a flow chart for an alternative method of customizing an application embedded in a web page based on the content of the web page according to an embodiment.

FIG. 14 depicts a flow chart for an alternative method 1400 of customizing an application embedded in a web page based on the content of the web page according to an embodiment. The method of FIG. 14, describes the steps performed on the application delivery system 305 in response to the steps performed by the application or context aware application 570 in the browser as described in FIG. 13. The method 1400 begins at step 1405. At step 1405, the application delivery system 305 receives a request from an application or context aware application 570 for customization data. The application or context aware application 570 may be running in the browser of a user or on a server of the application delivery system 305. The request includes the content of the webpage that the application or context aware application 570 is running in, or a link to the content of the webpage to the application or context aware application 570 is running in.

At step 1410, the controller 560 optionally obtains the content. If a link to the content is received, the controller 560 obtains the content.

At step 1415, the controller 560 sends the content to the content analyzer to analyze the content for topics. As discussed above, the content analyzer 505 may analyze the content differently for customizing an application or context aware application 570 than for selecting a context aware application 570. In some embodiments, the content analyzer 505 for customizing an application, or context aware application 570 is different from the content analyzer 505 used to select a context aware application 570. The content analyzer 505 returns topics to the controller 560.

At step 1420, the controller 560 receives the topics and sense of topics to the application customizer 565. At step 1425, the controller 560 receives data for customization from the application customizer 565.

At step 1430, the controller 560 sends data for customization back to the requesting application or context aware application 570. In some embodiments, the application or context aware application 570 is adapted to contact the content analyzer 505 directly and receive back directly the topics from the content analyzer 505. In some embodiments, the application or context aware application 570 is adapted to contact the application customizer 565 directly and receive back the customization data directly from the application customizer 565.

Figure 15:
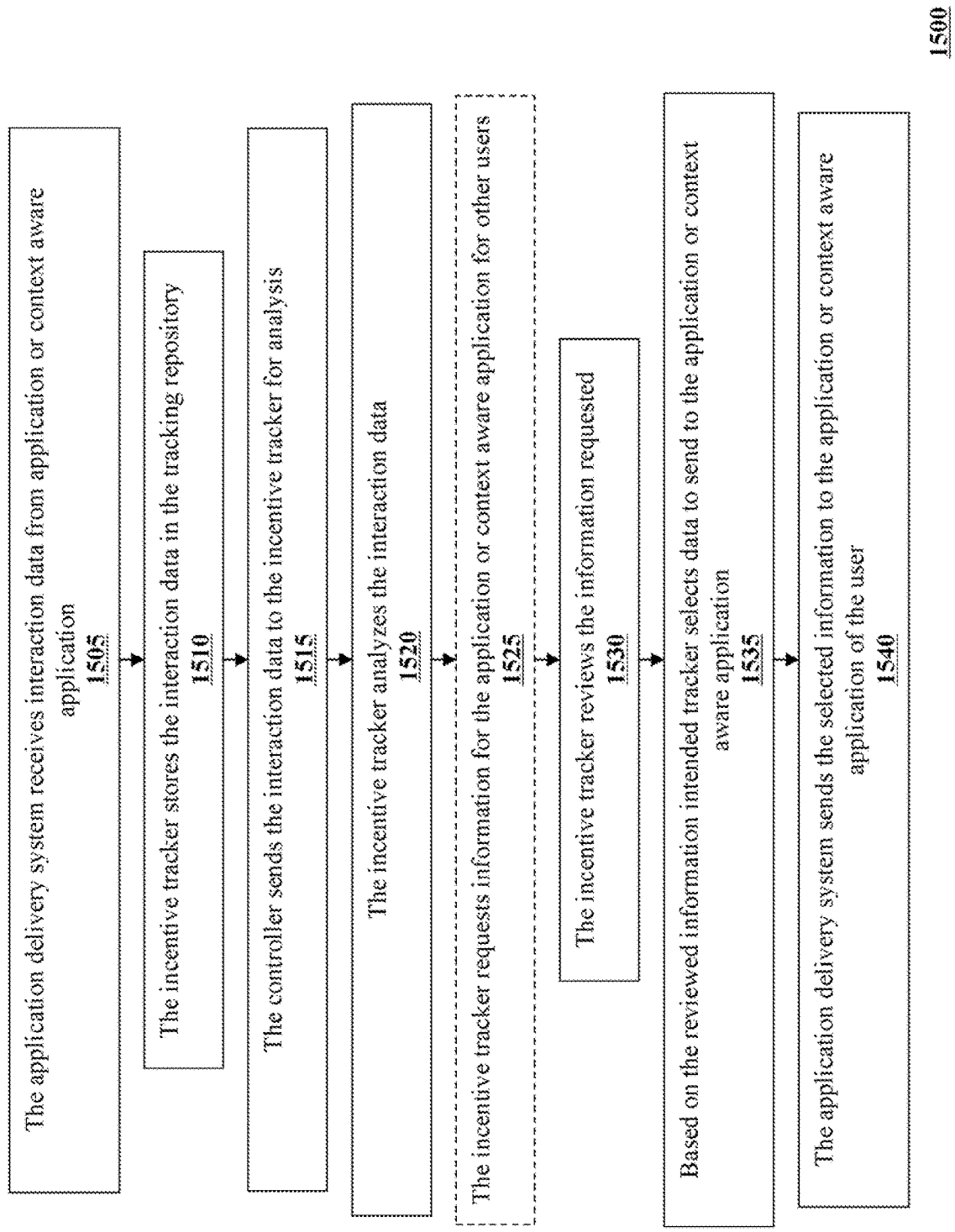
FIG. 15 depicts a flow chart for a method of tracking incentives according to an embodiment.

FIG. 15 depicts a flow chart for a method 1500 of tracking incentives according to an embodiment. The method as shown in FIG. 15, relates to the application delivery system 305 response to user interactions that are sent to the application delivery system 305, for example, at step 630 and step 940. In response to the user interactions, the application delivery system 305 sends data back to the context aware application 570, for example, at steps 635, and 945. The method shown in FIG. 15 may be performed on an application, customized application, context aware application 570, or customize content aware application. Any application embedded in a webpage that sends interaction data back to the application delivery system 305 may use the method shown in FIG. 15. The method 1500 begins at step 1505. At step 1505, the application delivery system 305 receives interaction data from application or context aware application 570. At step 1510, the incentive tracker stores the interaction data in the tracking repository 530.

At step 1515, the controller 560 sends the interaction data to the incentive system 535 for analysis. The interaction data may be, for example, the progress of a user in a game in, for example, the word game context aware application 110. Alternatively, the interaction data may be for the use of an application, for example, the poll/vote context aware application 205.

At step 1520, the incentive system 535 analyzes the interaction data and stored interaction data in the tracking repository 530. The incentive system 535 analyzes the interaction data based on the user using the application or context aware application 570, and the specific application or context aware application 570.

At step 1525, the incentive system 535 optionally requests information for the application or context aware application 570 for other users for the tracking repository 530. The other users may be users within the social group of the user using the context aware application 570, or any other group of users related to the user, in some manner. The group of users may be related by interests, occupation, geography, location, language group, etc.

At step 1530, the incentive system 535 reviews the information requested, including the content in which the context aware application is embedded. Further, the incentive system 535 matches progress from input of other users, in the requested information that is considered to be relevant or of interest to the user using the context aware application 570. For example, the incentive system 535 may note that there are users with a higher score in a game than the user of the application or context aware application 570. The incentive system 535 may note that a particular group of users has finished voting on a particular theme detailed in a poll/vote context aware application 570. Further, the incentive system 535 may check for rewards such as coupons, gift certificates, promotions, upgrades of context aware applications 570 etc. that correspond to data the reviewed information. The rewards may be provided by third parties that provide the context aware applications 570, or sponsor the context aware applications 570. The rewards may also be provided by third parties that provided or are cited in the content in which the context aware application 570 is embedded.

At step 1535, based on the reviewed information the incentive system 535 selects data to send to the application or context aware application 570. In some embodiments, the incentive system 535 ranks the various pieces of information noted during the review based on a predetermined ranking or set of rules. Information regarded as meeting a threshold of interest to the user of the application or context aware application 570, and that ranks highest in the review is selected for sending to the application or context aware application 570.

At step 1540, the application delivery system 305 sends the selected information to the application or context aware application 570 of the user. The user interaction tracker 525 and the incentive system 535 may constantly review the information in the tracking repository 530. The user interaction tracker 525 and the incentive system 535 may delete information no longer regarded as relevant and note significant milestones for particular applications and groups of users. For example, the incentive system 535 notes when a group of users has finished a particular activity, such as voting or completing a level of game, etc. Furthermore, the incentive system 535 may indicate to the user, other applications or context aware applications 570 that the user may be interested in, based on the activities of other users. The other users may be a part of any group related to the user. Moreover, the incentive system 535 may indicate to the user, other users that may be interested in the applications or context aware applications 570, based on the activities of other users. The user may then be enabled to invite the other users to use the application or context aware application 570. In some embodiments, the selected information is stored in the tracking repository 530, by the user interaction tracker 525.

Figure 16:
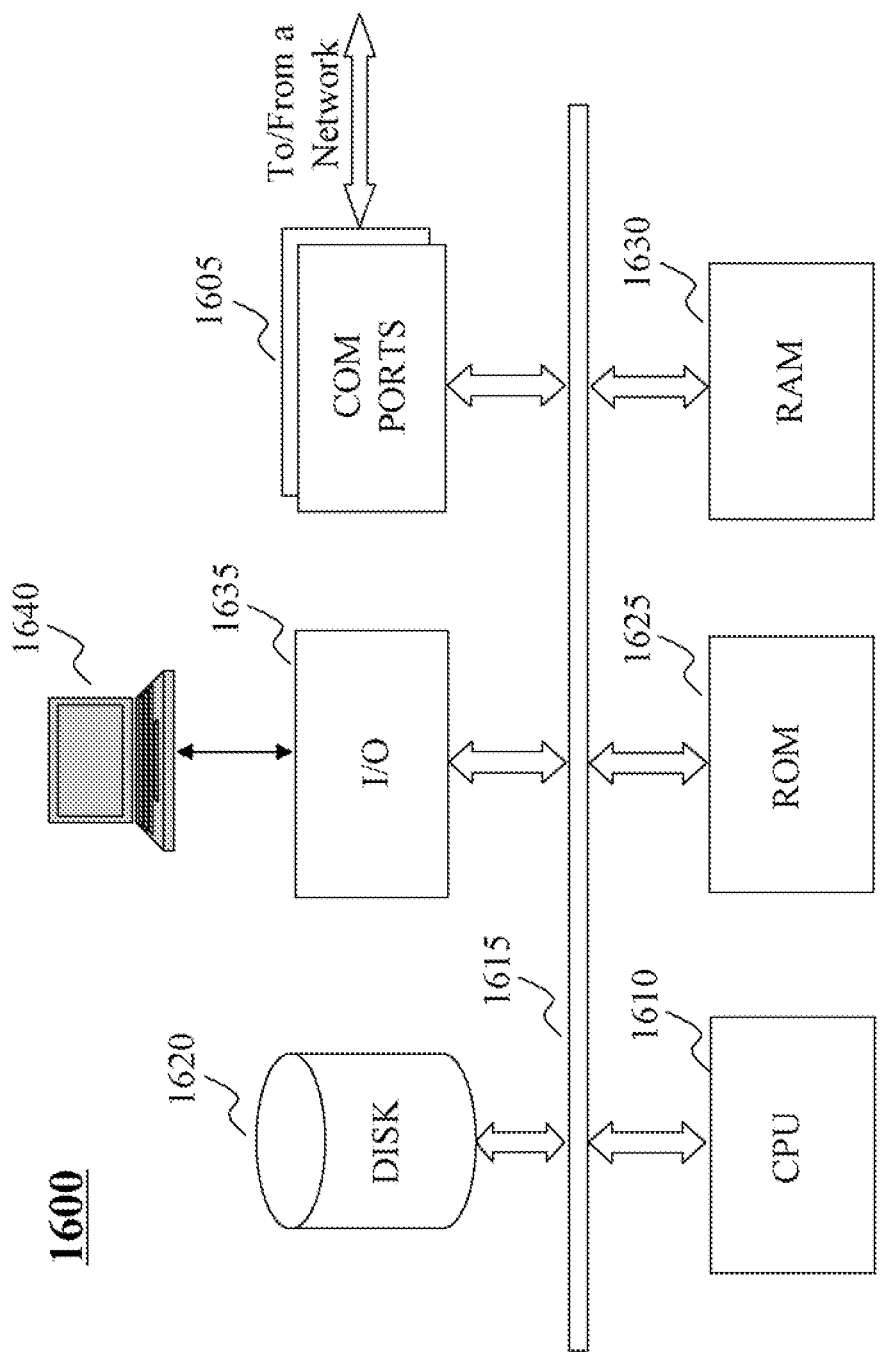
FIG. 16 illustrates a general computer architecture on which embodiments of the disclosure can be implemented.

FIG. 16 illustrates a general computer architecture 1600 on which embodiments of the disclosure can be implemented. The general computer architecture 1600 comprises COM ports 1605, a central processing unit 1610, an internal communication bus 1615, a disk 1620, a read only memory 1625, a random access memory 1630, an I/O component 1635, and a user interface 1640.

The general computer architecture 1600 may be a general-purpose computer or a special purpose computer. The general computer architecture 1600 can be used to implement any components of the application delivery system 305. For example, the content analyzer 505, the context aware application platform 510, the repository of contextual applications 515, the recommendation component 520, the user interaction tracker 525, the tracking repository 530, the incentive system 535, the analytics component 540, the network interface 550 the controller 560, and the application customizer 565 can all be implemented on a computer such as the general computer architecture 1600, via its hardware, software program, firmware, or a combination thereof. Although only one such computer is shown, for convenience, the computer functions relating to context aware application delivery may be implemented in a distributed fashion on a number of similar platforms, to distribute the processing load.

The COM ports 1605 connect the general computer architecture 1600 to and from a network connected thereto to facilitate data communications. The central processing unit 1610 may be in the form of one or more processors, for executing program instructions. The various data files to be processed and/or communicated by the computer as well as possibly program instructions to be executed by the central processing unit 1610 may be stored on the disk 1620 the read only memory 1625 or the random access memory 1630.

The I/O component 1635 supports input/output flows between the computer and other components therein such as user interface 1640. The computer may also receive programming and data via network communications.

Hence, aspects of the context aware application delivery system as outlined above may be embodied in programming. Program aspects of the technology may be thought of as "products" or "articles of manufacture" typically in the form of executable code and/or associated data that is carried on or embodied in a type of machine-readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer into the hardware platform(s) of a computing environment or other system implementing a computing environment or similar functionalities in connection with context aware application delivery. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium, or physical transmission medium. Non-volatile storage media include, for example, optical or magnetic disks, such as any of the storage devices in any computer(s) or the like, which may be used to implement the systems 300, 400, or any of these systems components as shown in the drawings. Volatile storage media include dynamic memory, such as a main memory of such a computer platform. Tangible transmission media include coaxial cables, copper wire, and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media, therefore, include, for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, systems and their components as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network for providing context aware applications, the method comprising:

obtaining, from a user, a first request for content of a first webpage;

identifying at least one topic from the content of the first webpage and one or more keywords included in the content of the first webpage, wherein the at least one topic is more general compared to the one or more keywords;

selecting, from a plurality of context aware applications, based on the identified at least one topic, a context aware application to be included in the first webpage;

customizing the selected context aware application to include at least a portion of at least one of the keywords in the selected context aware application;

providing, to the user, the first webpage including the content of the first webpage and the context aware application;

obtaining, from the user, a second request for content of a second webpage;

obtaining information regarding a current state of the context aware application with respect to the user, wherein the current state of the context aware application is determined based on a state of the context aware application when the user left the first webpage; and providing, to the user, the second webpage including the content of the second webpage and the context aware application in the current state.

2. The method of claim 1, wherein obtaining the first request comprises:

obtaining request information associated with the first request, wherein the context aware application is selected based on the request information.

3. The method of claim 1, wherein the context aware application is a word game application or a poll/vote application.

4. The method of claim 1, further comprising:

storing data related to interactions with the context aware application by the user prior to the second request being received such that the current state represents the context aware application with the interactions having been performed by the user.

5. The method of claim 4, wherein the data is stored in at least one of:

a hierarchical database under the user and the context aware application; and a filing system for the user comprising one or more folders, wherein one of the one or more folders is for the context aware application.

6. The method of claim 1, further comprising:

storing, prior to the second request being received, a mark indicating that the context aware application was in use, wherein determining the context aware application was in use comprises determining a presence of the mark.

7. The method of claim 1, further comprising:

storing interactions of other users with the context aware application prior to the second request being received; and providing the interactions of the other users with the context aware application and the content of the second webpage such that the interactions of the other users are capable of being displayed to the user.

8. A machine-readable and non-transitory medium having instructions recorded thereon for providing context aware applications, wherein the instructions, when read by the machine, cause the machine to:

obtain, from a user, a first request for content of a first webpage;

identify at least one topic from the content of the first webpage and one or more keywords included in the content of the first webpage, wherein the at least one topic is more general compared to the one or more keywords;

select, from a plurality of context aware applications, based on the identified at least one topic, a context aware application to be included in the first webpage;

customize the selected context aware application to include at least a portion of at least one of the keywords in the selected context aware application;

provide, to the user, the first webpage including the content of the first webpage and the context aware application;

obtain, from the user, a second request for content of a second webpage;

obtain information regarding a current state of the context aware application with respect to the user, wherein the current state of the context aware application is determined based on a state of the context aware application when the user left the first webpage; and provide, to the user, the second webpage including the content of the second webpage and the context aware application in the current state.

9. The machine-readable and non-transitory medium of claim 8, wherein the instructions associated with the first request being obtained, when read by the machine, cause the machine to:

obtain request information associated with the first request, wherein the context aware application is selected based on the request information.

10. The machine-readable and non-transitory medium of claim 8, wherein the context aware application is a word game application or a poll/vote application.

11. The machine-readable and non-transitory medium of claim 8, wherein the instructions, when read by the machine, further cause the machine to:

store data related to interactions with the context aware application by the user prior to the second request being received such that the current state represents the context aware application with the interactions having been performed by the user.

12. The machine-readable and non-transitory medium of claim 11, wherein the data is stored in at least one of:

a hierarchical database under the user and the context aware application; and a filing system for the user comprising one or more folders, wherein one of the one or more folders is for the context aware application.

13. The machine-readable and non-transitory medium of claim 8, wherein the instructions, when read by the machine, further cause the machine to:

store, prior to the second request being received, a mark indicating that the context aware application was in use, wherein determining the context aware application was in use comprises determining a presence of the mark.

14. The machine-readable and non-transitory medium of claim 8, wherein the instructions, when read by the machine, further cause the machine to:

store interactions of other users with the context aware application prior to the second request being received; and provide the interactions of the other users with the context aware application and the content of the second webpage such that the interactions of the other users are capable of being displayed to the user.

15. A system for providing context aware applications, comprising:

a controller implemented by a processor and adapted to obtain, from a user, a first request for content of a first webpage;

a content analyzer implemented by the processor and adapted to identify at least one topic from the content of the first webpage and one or more keywords included in the content of the first webpage, wherein the at least one topic is more general compared to the one or more keywords;

a user interaction tracker implemented by the processor and adapted to
- select, from a plurality of context aware applications, based on the identified at least one topic, a context aware application to be included in the first webpage, an application customizer implemented by the processor and adapted to customize the selected context aware application to include at least a portion of at least one of the keywords in the selected context aware application, wherein the controller is further adapted to:
- provide, to the user, the first webpage including the content of the first webpage and the context aware application, and
- obtain, from the user, a second request for content of a second webpage;

wherein the user interaction tracker is further adapted to
- obtain information regarding a current state of the context aware application with respect to the user, wherein the current state of the context aware application is determined based on a state of the context aware application when the user left the first webpage; and wherein
the controller is further adapted to provide, to the user, the second webpage including the content of the second webpage and the context aware application in the current state.

16. The system of claim 15, wherein the information being obtained comprises the user interaction tracker being adapted to:
obtain request information associated with the first request, wherein the context aware application is selected based on the request information.

17. The system of claim 15, wherein the context aware application is a word game application or a poll/vote application.

18. The system of claim 15, further comprising:
a tracking repository implemented by the processor and adapted to store data related to interactions with the context aware application by the user prior to the second request being received such that the current state represents the context aware application with the interactions having been performed by the user.

19. The system of claim 15, wherein the user interaction tracker is further adapted to:
store, prior to the second request being received, a mark indicating that the context aware application was in use, wherein determining the context aware application was in use comprises determining a presence of the mark.

20. The system of claim 15, further comprising:
a tracking repository implemented by the processor and adapted to store interactions of other users with the context aware application prior to the second request being received, wherein:
the controller is further adapted to provide the interactions of the other users with the context aware application and the content of the second webpage such that the interactions of the other users are capable of being displayed to the user.

* * * * *